(12) United States Patent
Kawaguchi et al.

(10) Patent No.: US 7,664,066 B2
(45) Date of Patent: Feb. 16, 2010

(54) WIRELESS DEVICE, METHOD FOR WIRELESS COMMUNICATION SYSTEM, AND WIRELESS COMMUNICATION SYSTEM

(75) Inventors: Takamasa Kawaguchi, Yokohama (JP); Nobuyoshi Ando, Kawasaki (JP); Takayoshi Fujioka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 776 days.

(21) Appl. No.: 11/000,095

(22) Filed: Dec. 1, 2004

(65) Prior Publication Data

US 2006/0002366 A1      Jan. 5, 2006

(30) Foreign Application Priority Data

Jul. 5, 2004    (JP) .............................. 2004-198103

(51) Int. Cl.
    *H04Q 7/24*    (2006.01)
(52) U.S. Cl. ..................... 370/328; 370/331; 370/252; 455/445
(58) Field of Classification Search .................. None
    See application file for complete search history.

(56) References Cited

U.S. PATENT DOCUMENTS 5,987,011 A * 11/1999 Toh ............................ 370/331

| | | | |
|---|---|---|---|
| 2003/0202468 A1 | 10/2003 | Cain et al. | |
| 2003/0202476 A1 | 10/2003 | Billhartz et al. | |
| 2003/0204623 A1 | 10/2003 | Cain | |
| 2004/0233855 A1* | 11/2004 | Gutierrez et al. ............ | 370/252 |
| 2006/0293061 A1* | 12/2006 | Kobayashi et al. .......... | 455/455 |

FOREIGN PATENT DOCUMENTS

| JP | 11-239176 | 8/1999 |
|---|---|---|
| JP | 2001-115858 | 4/2003 |
| JP | 2003-249936 | 9/2003 |
| JP | 2004-56787 | 2/2004 |

* cited by examiner

*Primary Examiner*—Erika A Gary
(74) *Attorney, Agent, or Firm*—Antonelli, Terry, Stout & Kraus, LLP.

(57) ABSTRACT

A wireless device according to the present invention minimizes the need for changing a communication route in an ad hoc network including wireless devices used for base stations, fixed stations, and mobile stations that are turned on/off or moved, wherein, when wireless devices cannot directly send or receive radio waves, data can be transmitted between them by relaying data via other wireless devices that can directly send or receive radio waves (multi-hopping). In selecting a communication route, a communication route that includes wireless devices that are turned off or moved least frequently is selected.

16 Claims, 29 Drawing Sheets

FIG. 17

| DEVICE TYPE CODE | MANUFAC-TURER CODE | MODEL | POWER SUP-PLY TYPE 114 |
|---|---|---|---|
| 0001 | 0031 | XXX-000111 | 100 VAC POWER |

DEVICE INFORMATION TABLE

FIG. 18

| DESTINATION UPPER ADDRESS | NEXTHOP LOWER ADDRESS 140 |
|---|---|
| 1-1 | A |
| 1-3 | C |
| 1-4 | D |
| 1-5 | D |
| 1-6 | D |
| 1-7 | D |

ROUTING TABLE

FIG. 19

ELECTRIC WAVE LEVEL HISTORY TABLE (142)

| LOWER ADDRESS | TIME | ELECTRIC WAVE LEVEL |
|---|---|---|
| E | 3/1 10:11 | 3 |
| F | 3/1 10:11 | 2 |
| E | 3/1 10:21 | 3 |
| F | 3/1 10:21 | 2 |
| E | 3/1 10:31 | 0 |
| F | 3/1 10:31 | 3 |
| E | 3/1 10:41 | 0 |
| F | 3/1 10:41 | 3 |

FIG. 20

LOCAL TERMINAL EVALUATION VALUE TABLE (141)

| DEVICE TYPE | POWER SUPPLY TYPE | LOCAL TERMINAL EVALUATION VALUE |
|---|---|---|
| HOME SERVER | AC100V | 0.95 |
| INTERMEDIARY RELAY DEVICE | AC100V | 0.95 |
| INTERMEDIARY RELAY DEVICE | AC100V WITH UNINTERRUPTIBLE POWER SUPPLY | 1.0 |
| SENSOR | BATTERY | 0.5 |
| SENSOR | AC100V | 0.95 |
| AIR CONDITIONING EQUIPMENT | BATTERY | 0.7 |
| LIGHTING DEVICE | BATTERY | 0.6 |

FIG. 21

ROUTE SEARCH PACKET RECEPTION TABLE ~143

| ROUTE SEARCH PACKET ID | RECEPTION TIME | HOP COUNT |
|---|---|---|
| 0000 | 0:12:52 | 5 |
| 00A2 | 0:12:48 | 4 |
| 000B | 0:11:26 | 8 |
| 10CD | 0:13:01 | 3 |
| 0723 | 0:12:32 | 5 |
| ⋮ | ⋮ | ⋮ |

FIG. 22

OPERATION STATE TRANSITION TABLE ~144

| OPERATION STATE | START TIME | END TIME |
|---|---|---|
| POWER OFF | — | 2003-5-12 07:23:10 |
| HALT STATE | 2003-5-12 07:23:10 | 2003-5-12 07:23:11 |
| INITIALIZING STATE | 2003-5-12 07:23:11 | 2003-5-12 07:23:27 |
| COMMUNICATING STATE | 2003-5-12 07:23:27 | 2003-10-27 23:26:10 |
| ERROR STOP STATE | 2003-10-27 23:26:10 | 2003-10-28 00:27:33 |
| COMMUNICATING STATE | 2003-10-28 00:27:33 | 2004-5-12 10:15:44 |
| POWER OFF | 2004-5-12 10:15:44 | 2004-5-16 08:15:23 |
| HALT STATE | 2004-5-16 08:15:23 | 2004-5-16 08:15:24 |
| ⋮ | ⋮ | ⋮ |

DATA PACKET

ROUTE NO-COMMUNICATION
NOTIFICATION PACKET

WIRELESS DEVICE, METHOD FOR WIRELESS COMMUNICATION SYSTEM, AND WIRELESS COMMUNICATION SYSTEM

INCORPORATION BY REFERENCE

The present application claims priority from Japanese application JP 2004-198103 filed on Jul. 5, 2004, the content of which is hereby incorporated by reference into this application.

BACKGROUND OF THE INVENTION

The present invention relates to a wireless device, a control method for a wireless communication system, and a wireless communication system.

A recent advance in the information communication technology has resulted in the development of many electrical appliances with the network communication function. Those electrical appliances, used in the home or offices, have computerized houses and buildings, leading to the development of a technology for providing more convenient, comfortable living environments.

On the other hand, connecting those electrical appliances to a network requires network construction work in the home and buildings, and the network construction work requires technical knowledge about the communication cable wiring and connections as well as hard work and high construction costs. Therefore, there is a need for building a network without doing network construction work.

To satisfy this need, a wireless network technology has been developed. This network technology uses the wireless communication method and allows wireless devices, which cannot directly communicate each other, to communicate via intermediary relay devices (wireless devices that relays communication), thus enabling a plurality of wireless devices to communicate each other with no need to do the network construction work. Such a wireless network, generally called an ad hoc network, is a network where data communication among wireless devices, including base stations, fixed stations, and mobile stations, is performed via a plurality of intermediary wireless devices. The following technologies are disclosed as a technology for building a network where data is relayed via wireless devices (For example, see JP-A-11-239176, JP-A-2003-115858).

In an ad hoc network, the selection of a communication route composed of wireless devices, along which data is passed during the communication, largely affects the throughput and the reliability of the whole network system and the ease of system management. Therefore, the technology for selecting and determining the best communication route is important.

The most popular conventional method for selecting and determining the best communication route from a plurality of communication routes is to select a communication route with the minimum number of hops (the number of intermediary relay devices).

However, when an intermediary relay device moves from one place to another or the power is turned off after a communication route is determined, the communication route using the intermediary relay device cannot be used. As a result, the source wireless device using this intermediary relay device as one of intermediary relay devices of the communication route must search for another communication route to the destination wireless device again.

In general, this communication route search is complex and time-consuming. Another problem is that, immediately after an intermediary relay device moves or the power is turned off, a data packet being transferred is stored in the buffer of the intermediary relay device until a new destination is found. When the buffer of the intermediary relay device becomes full, a packet loss may occur.

Searching for a new communication route also requires the transmission of many data packets and, therefore, more packets tend to be lost due to an increase in the traffic. A packet loss also involves the frequent retransmission of a packet at an application level, meaning that more and more wasteful data packets are generated.

Therefore, in such a network, it is important to select a route that does not require a repeated search for a route.

SUMMARY OF THE INVENTION

In view of the problems described above, the present invention provides a wireless device that allows the wireless devices to communicate each other via intermediary relay devices, that is used in a wireless network where intermediary relay devices are sometimes moved or the power is turned off, that minimizes the need to re-search for a communication route, and that provides a stable, reliable communication environment.

To solve the above problems, the present invention provides a wireless device for use in a wireless communication system comprising a plurality of wireless devices wherein communication between the wireless devices is carried out by sending data, which is received from some other wireless device, from one of the wireless devices to a next wireless device via a communication route determined in advance according to a destination of the data, the wireless device comprising means to store a communication route management table in which an identifier of a data destination wireless device is associated with an identifier of the wireless device indicating a next destination of the data, and information indicating an operation ratio of a wireless communication function of the wireless device itself; means to send a route search packet to the wireless devices that can directly communicate with the wireless device itself when data is sent to one of the other wireless devices via a new communication route, the route search packet including an identifier of the other wireless device that is a data destination and an identifier of the wireless device itself that is a search source of the new communication route; means, for use when the route search packet is received and if the identifier of the destination wireless device included in the received route search packet does not match the identifier of the wireless device itself, to add the identifier of the wireless device itself and the information indicating an operation ratio of a wireless communication function of the wireless device itself to the received route search packet and to send the route search packet to the wireless devices that can directly communicate with the wireless device itself; means, for use when the route search packet is received and if the identifier of the destination wireless device included in the received route search packet matches the identifier of the wireless device itself, to calculate a reliability of a communication route via which the route search packet is sent based on the information indicating the operation ratios of the wireless devices added by the wireless devices via which the received route search packet is sent; and means to determine the new communication route for sending the data from the search source wireless device to the wireless device itself based on the information indicating the communication route reliability calculated for each of the route search packets that are sent with the wireless device itself as the destination.

In addition, the problems disclosed by this application and the solutions will become more fully apparent from the following detailed description taken in conjunction with accompanying drawings.

The present invention provides a wireless device, a wireless communication system control method, and a wireless communication system for providing a communication environment that minimizes the need for route re-search processing and ensures stable operation.

BRIEF DESCRIPTION OF THE DRAWINGS

FIG. 17 is a diagram showing a device information table in the embodiment.

FIG. 18 is a diagram-showing a routing table in the embodiment.

FIG. 19 is a diagram showing an electric wave level history table in the embodiment.

FIG. 20 is a diagram showing a terminal evaluation value table in the embodiment.

FIG. 21 is a diagram showing a route search packet reception table in the embodiment.

FIG. 22 is a diagram showing an operation state transition table in the embodiment.

DESCRIPTION OF THE EMBODIMENTS

Example of General Configuration

Figure 1:
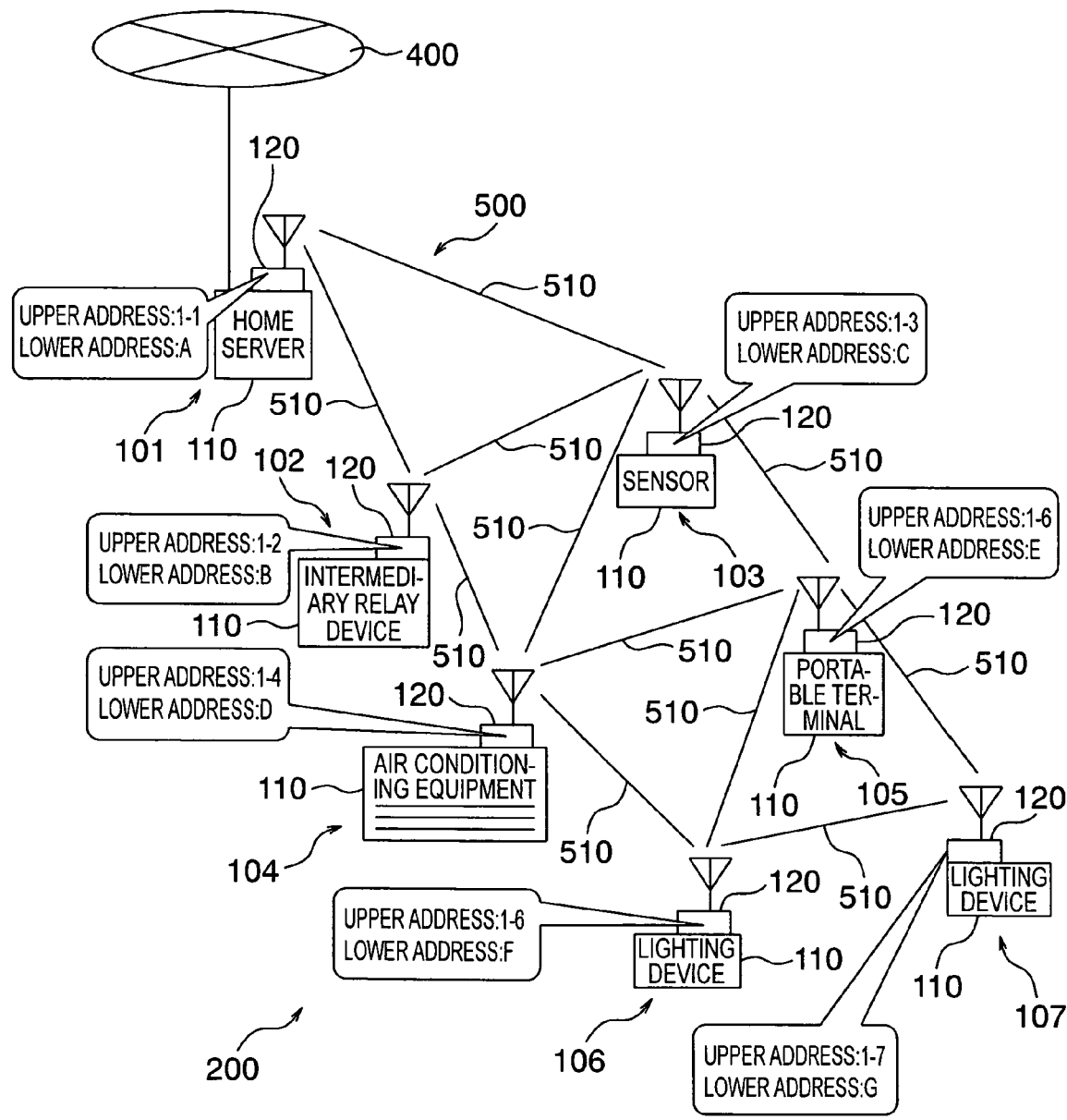
FIG. 1 is a block diagram showing the general configuration of a wireless communication system in an embodiment.
Figure 2:
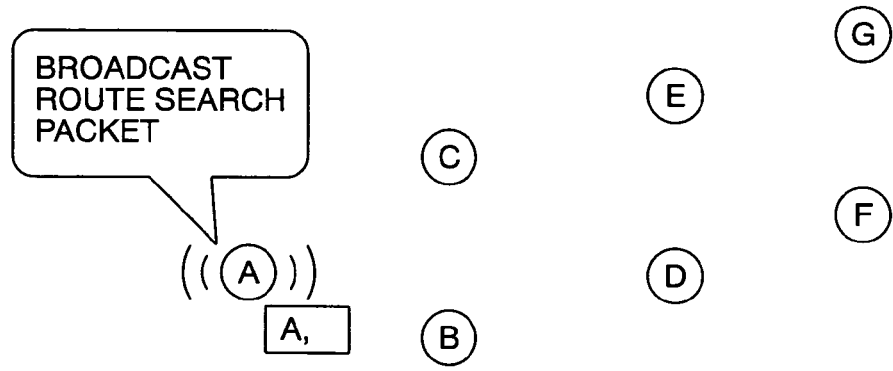
FIG. 2 is a diagram showing the route search processing in the embodiment.
Figure 3:
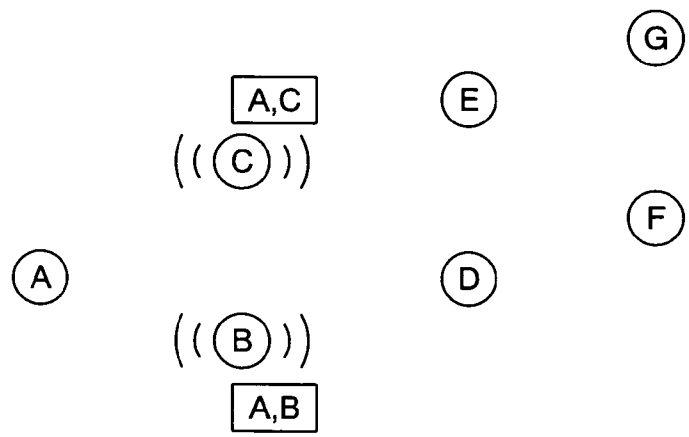
FIG. 3 is a diagram showing the route search processing in the embodiment.

FIG. 1 shows the general configuration of a wireless communication system 200 including a wireless device 100 in this embodiment. This figure shows an example of the wireless communication system 200 configured by using various home electrical appliances and electrical appliances in the home as wireless devices 100. The wireless communication system 200 in this embodiment may be used in the home, in an office or a building, and even outdoors. As shown in FIG. 1, a home server 101, an specialized intermediary relay device 102, a sensor 103, air conditioning equipment 104, a portable terminal 105, a lighting device 106, and a lighting device 107 are used in this embodiment as wireless devices 100.

The home server 101 functions as a gateway that controls the communication between a network (second network) 500, to which the wireless devices 100 of the above-mentioned wireless communication system 200 in the home are connected, and a network (first network) 400 external to the home. The first network 400 is a network that communicates with an access point of an Internet service provider at a lower network layer using a communication method such as ADSL, FTTH, and ISDN (registered trademark).

On the second network 500, the wireless devices 100 are interconnected by intermediary paths 510. In the wireless communication system 200 in this embodiment, the communication among the wireless devices 100 is carried in such a way that each wireless device 100 sends data, received from some other wireless device, to the next wireless device 100 on a communication route determined according to the data destination. The intermediary path 510 is a communication line used for the communication between the neighboring wireless devices 100, that is, between wireless devices 100 that can directly communicate each other. Of course, there is no physical communication line because the wireless devices 100 communicate each other wirelessly. The communication between the wireless devices 100 via the intermediary path 510 is carried out at a lower network layer via a communication method according to the standard, for example, IEEE802.11a, IEEE802.11b, IEEE802.11g, Bluetooth, specified low power radio, or IrDA. The communication between the wireless devices 100 via the intermediary path 510 may be carried out using the same communication method or a combination of different communication methods.

The home server 101 can be configured, for example, by a personal computer. The home server 101 can also be configured by a wattmeter or a breaker box installed in the home.

The specialized intermediary relay device 102 is an electrical appliance that has the function dedicated for relaying the wireless communication carried out by the wireless communication system 200 in the home. For example, the specialized intermediary relay device 102 is installed in a place in the home, for example, an entrance, a closet, or a corridor, where the radio wave for wireless communication sometimes does not reach because an electrical appliance is not usually installed there.

The sensor 103 is, for example, a temperature sensor that measures the temperature in a room. The information indicating the temperature measured by the sensor 103 is sent, for example, to the home server 101. The home server 101 judges the room temperature and other various factors comprehensively to send an operation start or stop instruction to the air conditioning equipment 104. Of course, the temperature information can be sent directly from the sensor 103 to the air conditioning equipment 104. The sensor 103 may be a temperature sensor as well as a humidity sensor, a brightness sensor, or an intruder sensor.

The air conditioning equipment 104 is a device that controls the temperature or the humidity in a room. For example, the air conditioning equipment 104 is an air conditioner or a ventilator fan.

The portable terminal 105 is an electrical appliance that can be carried easily, for example, a cellular phone, a codeless phone, a PDA, or a remote control of a television set.

The lighting device 106 and the lighting device 107 are electrical appliances that illuminate the surrounding area. Of course, in addition to the devices described above, any kind of electrical appliance can be used as the wireless device 100. Those appliances include a clock, an intercom, a refrigerator, a washing machine, a microwave oven, an iron, a radio receiver, a TV set, a telephone, a stereo set, a computer, a water heater, an electric fan, a wrist watch, a kotatsu, a camera, a copier, a printer, a desktop calculator, a stove, an oven, a video recorder/player, a DVD recorder/player, a facsimile receiver/transmitter, a cloth drier, a dish washing and drying machine, a water cleaner, an elevator, a solar power generator, and an under-floor fan.

As will be described later in detail, each wireless device 100 comprises an application device 110 that performs a control operation as a home electrical appliance and a wireless terminal 120 that controls the communication with other wireless devices 100.

When used as the wireless device 100, the electrical appliances differ greatly in terms of the operation stability of the wireless communication function. For example, a TV set is turned on only when the user watches a TV program, a refrigerator is always turned on except at an electric power failure time, a washing machine is installed a fixed place, a camera is frequently carried by the user, the portable terminal 105 is powered by a battery, and the air conditioning equipment 104 receives power from an outlet.

For example, an electrical appliance that is not usually turned off can provide the reliable wireless communication function. An electrical appliance that is installed at a fixed place can also provide the reliable wireless communication function. An electrical appliance that receives power from an outlet can also provide the reliable wireless communication function. As the strength of the radio wave for the wireless communication between electrical appliances becomes increased, the wireless communication function can be provided more reliably.

When information is communicated wirelessly between wireless devices 100 in the wireless communication system 200 as described above, the reliability of the communication route to the destination wireless device 100 is important. For example, when the user wants to operate the air conditioning equipment 104 such as an air conditioner away from home to control the room temperature before returning home but the wireless communication between the home server 101 and the air conditioning equipment 104 is not carried out properly, it is likely that user must bear the heat and humidity in the room for some time after coming back home.

===Identifier of Wireless Device===

Next, the identifier of the wireless device 100 in this embodiment will be described. As shown in FIG. 1, the home server 101, specialized intermediary relay device 102, sensor 103, air conditioning equipment 104, portable terminal 105, lighting device 106, and lighting device 107 in this embodiment are each assigned a lower address and an upper address for communication with the second network 500.

The lower address is an address used for the communication at the lower layer of the network. For example, the lower address is an address conforming to the IEEE802 standard, wherein the lower address is at least a value uniquely identifying each wireless device 100 in the network system in the embodiment. For convenience, the lower address is composed of one-byte hardware identifier in this embodiment.

On the other hand, the upper address is an address used by an application to specify a destination when the application sends a message to a specific node (wireless device 100) in a network where different lower layers are interconnected. The upper address is composed, for example, a one-byte network identifier and a one-byte node identifier. The network identifier is a value that can uniquely identify a subnet at least in the network system, while the node identifier is a value that can uniquely identify a device at least in each subnet.

For each wireless device 100 shown in FIG. 1, the lower address "A-G", the network identifier "1", and the node identifier "1-7" are assigned.

===Overview of Communication Route Search===

Next, the overview of the communication route search for a reliable communication route, which is executed in the wireless communication system 200 in this embodiment when one wireless device 100 wants to send data to another wireless device 100, will be described with reference to FIGS. 2-8.

In the description below, assume that the wireless devices 100 constituting the wireless communication system 200 are identified by A, B, C, D, E, F, and G. Also assume that a communication route from the wireless device A 100 to the wireless device G 100 will be found.

As will be described in detail later, each wireless device 100 stores therein a routing table (communication route management table) 140, information indicating the operation ratio of its wireless communication function, and information indicating the reliability of communication between the wireless device 100 and each wireless device 100 with which direct communication can be carried out.

The routing table 140 associates the identifier of the wireless device 100, to which the data is to be sent, with the identifier of the wireless device 100 to which data is to be sent next. FIG. 18 shows an example of the routing table. Each wireless device 100 sends data, whose destination is the wireless device 100 specified by the identifier of the wireless device 100 described in the "Destination upper address" column of its routing table 140, to the wireless device 100 specified by the identifier of the wireless device 100 described in the "NextHop lower address" column. This enables each wireless device 100 to send data, received from some other wireless device 100, to the next wireless device 100 that is in the communication route defined based on the data destination.

As will be described in detail later, the information indicating the operation ratio of its wireless communication function indicates the ratio of the wireless communication function operation time to the time elapsed from the first operation of its wireless communication function to the current time. That is, this information implies that a communication route including wireless devices 100 with a high wireless communication function operation ratio is expected to be reliable.

The information indicating the operation ratio of its wireless communication function also indicates the ratio of the number of wireless communication function operations, whose operation time elapsed from the start to the end is longer than the time elapsed from the start of the current wireless communication function operation to the current time, to the total number of wireless communication function operations that were once started and ended. That is, this information implies that, if a communication route has a higher ratio of including one or more wireless devices 100 whose operation time elapsed from the start to the end is longer than the time elapsed from the start of the current wireless operation to the current time, the communication route is expected to be reliable in future.

The information indicating the reliability of communication between a wireless device 100 and other wireless devices 100 with which the wireless device 100 can directly communicate is the information indicating the strength of radio waves generated when communication is carried out with those wireless devices 100. If the communication can be carried out with some other wireless device 100 using a strong radio wave, the reliable wireless communication can be expected without an interruption by a noise.

In this embodiment, the best route from the wireless device A 100 to the wireless device G 100 is found as follows. First, the wireless device A (second wireless device) 100, which will send data to the destination wireless device G (first wireless device) 100 via a new communication route, sends a route search packet to the other wireless devices 100 that can directly communicate with wireless device A 100 (see FIG. 2). The route search packet includes the identifier (G) of the wireless device G 100 that is the destination of the data and the identifier (A) of the wireless device A 100 that is the search source of the new communication route. The route search packet will be described later in detail. The wireless device A 100 can send this packet, for example, in the broadcast mode, to other wireless devices 100 with which it can communicate directly. Note that the identifier (G) of the destination wireless device G 100 is omitted in the route search packet shown in FIG. 2 to FIG. 8.

Next, each of the wireless devices that receive the route search packet (wireless device B 100 and wireless device C 100 in this example) checks if the identifier (G) of the data destination wireless device, included in the route search packet, matches that of this wireless device. If the identifier differs from that of this wireless device, the wireless device adds the information to the received route search packet, wherein the information that is added is composed of the identifier of this wireless device, information indicating the operation ratio of the wireless communication function of this wireless device, and the information indicating the reliability of communication between the wireless device 100 (A), from which the route search packet is received, and this wireless device. Then, this wireless device sends the route search packet to the other wireless devices 100 that can directly communicate with this wireless device.

More specifically, because the identifier of the wireless device G 100 included in the route search packet received from the wireless device A 100 differs from the identifier (B) of the wireless device B 100, the wireless device B 100 adds the information to the received route search packet, wherein the information that is added is composed of the identifier (B) of the wireless device B 100, the information indicating the operation ratio of the wireless communication function of the wireless device B 100, and the information indicating the reliability of communication between the wireless device 100 (A) from which the route search packet is received and the wireless device B 100. Then, the wireless device B 100 sends the route search packet to the other wireless devices 100 (wireless device A 100, wireless device C 100, and wireless device D 100) that can directly communicate with the wireless device B 100 (see FIG. 3).

On the other hand, because the identifier of the wireless device G 100 included in the route search packet received from the wireless device A 100 differs from the identifier (C) of the wireless device C 100, the wireless device C 100 adds the information to the received route search packet, wherein the information that is added is composed of the identifier (C) of the wireless device C 100, the information indicating the operation ratio of the wireless communication function of the wireless device C 100, and the information indicating the reliability of communication between the wireless device 100 (A) from which the route search packet is received and the wireless device C 100. Then, the wireless device C 100 sends the route search packet to the other wireless devices 100 (wireless device A 100, wireless device B 100, and wireless device E 100) that can directly communicate with the wireless device C 100 (see FIG. 3).

After that, each of the wireless devices (wireless device A 100, wireless device B 100, wireless device C 100, wireless device D 100, and wireless device E 100 in this case) that receive the route search packet from the wireless device B 100 and the wireless device C 100 checks if the identifier (G) of the data destination wireless device, included in the route search packet, matches that of the wireless device. If the identifier differs from that of this wireless device, the wireless device adds the information to the received route search packet, wherein the information that is added is composed of the identifier of the wireless device, information indicating the operation ratio of the wireless communication function of the wireless device, and the information indicating the reliability of communication between the wireless device 100, from which the route search packet is received, and the wireless device. Then, the wireless device sends the route search packet to the other wireless devices 100 that can directly communicate with the receiving wireless device (see FIG. 4).

Note that the wireless device A 100, one of the wireless devices (A, B, C, D, and E) that receive the route search packet, receives the route search packet that the wireless device A 100 sent before. In such a case, the wireless device A 100 does not send the received route search packet any more. Whether the receiving wireless device receives the route search packet it sent before can be checked by checking if the identifier of the wireless device has already been added to the received route search packet. This checking eliminates a communication route that includes a loop.

Figure 4:
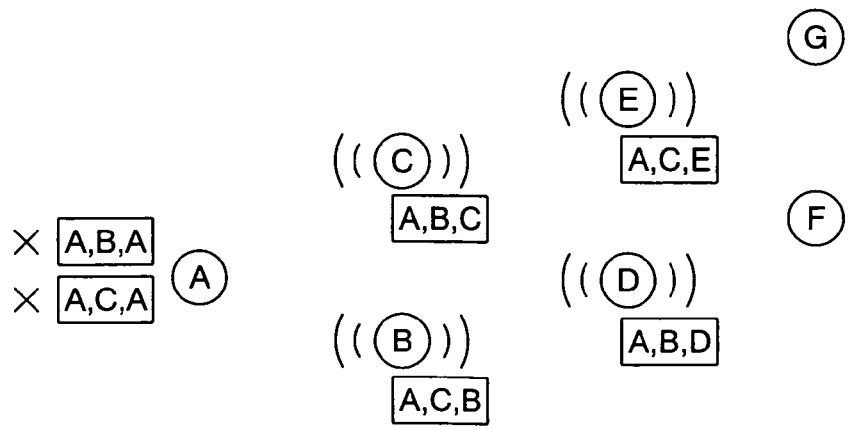
FIG. 4 is a diagram showing the route search processing in the embodiment.

Referring to FIG. 4, the wireless device E 100 adds the information to the received route search packet, wherein the information that is added is composed of the identifier of the wireless device E 100, the information indicating the operation ratio of the wireless communication function of the wireless device E 100, and the information indicating the reliability of communication between the wireless device 100 from which the route search packet is received and the wireless device E 100. When the wireless device E 100 sends the route search packet to the other wireless devices 100 that can directly communicate with the wireless device E 100, the route search packet is sent also to the wireless device G 100 (see FIG. 5).

The wireless device G 100 that receives the route search packet finds that the identifier (G) of the data destination wireless device, included in the received route search packet, matches the identifier of the wireless device G 100. The wireless device G 100 first calculates the information indicating the reliability of the communication route via which the route search packet was transferred, based on the information indicating the operation ratios of the wireless devices 100 added by the wireless devices 100 via which the received route search packet was passed, the information indicating the reliability of the communications, and the information indicating the reliability of communication between the wireless device E 100 and the wireless device G 100 (G).

Figure 5:
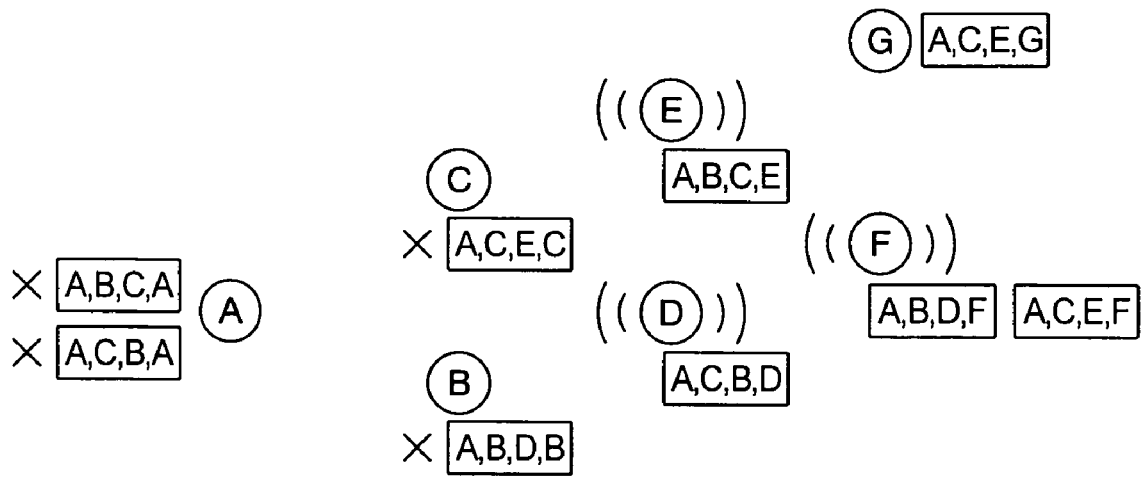
FIG. 5 is a diagram showing the route search processing in the embodiment.

Referring to FIG. 5, the route search packet sent to the wireless device G 100 is sent from the wireless device A 100 to the wireless device G 100 via the wireless device C 100 and the wireless device E 100. The route search packet includes the operation ratios and the communication reliability information on the wireless devices 100 added by the wireless device C 100 and the wireless device E 100. The wireless device G 100 calculates the information indicating the reliability of the communication route via which the route search packet was sent, for example, by multiplying the operation ratios of the wireless devices 100 by the information indicating the reliability of the communications. Of course, instead of multiplying the operation ratios of the wireless devices 100 by the information indicating the reliability of the communications, the reliability of the communication route can also be calculated by adding up those values. The reliability of the communication route can also be calculated by adding up the value obtained by multiplying together the operation ratios of the wireless devices 100 and the value obtained by multiplying together the information indicating the reliability of the communications. Similarly, the reliability of the communication route can also be calculated by multiplying the total of the operation ratios of the wireless devices 100 by the total of the information indicating the reliability of the communications. In addition, the information indicating the reliability of the communication route can also be calculated based on the average value of the operation ratios of the wireless devices 100 and the average value of the information indicating the reliability of the communications.

Figure 6:
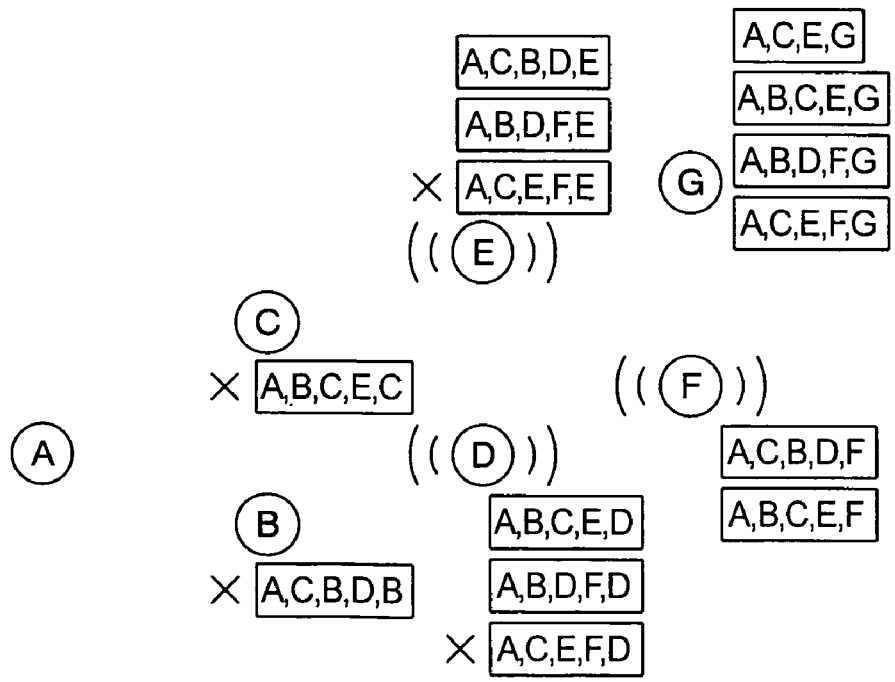
FIG. 6 is a diagram showing the route search processing in the embodiment.
Figure 7:
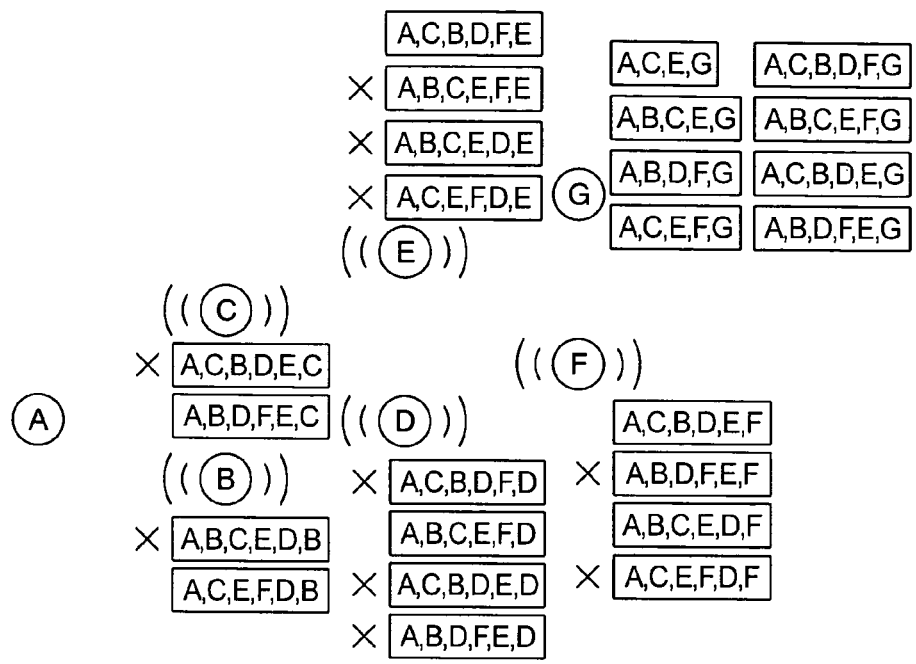
FIG. 7 is a diagram showing the route search processing in the embodiment.
Figure 8:
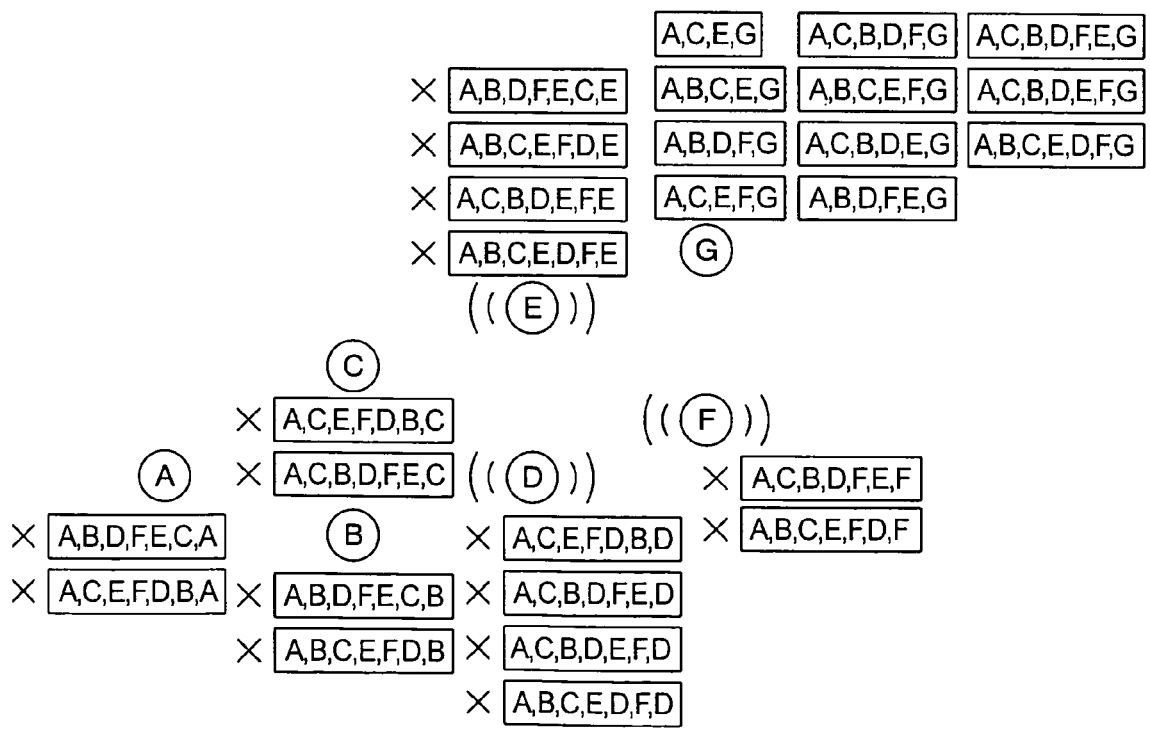
FIG. 8 is a diagram showing the route search processing in the embodiment.

As shown in FIG. 6, FIG. 7, and FIG. 8, the route search packet is sent similarly among the wireless device 100. As a result, the route search packets sent via a total of 11 communication routes are eventually sent to the wireless device G 100 as shown in FIG. 8.

The wireless device G 100 calculates the information indicating the reliability of the communication route for each route search packet which is sent to the wireless device G 100 via one of various communication routes and whose destination wireless device 100 is the wireless device G 100. Based on the calculated information indicating the reliability of each communication route, the wireless device G 100 determines a new communication route for sending data from the wireless device A 100 to the wireless device G 100. For example, a communication route whose information indicating the communication route reliability is highest can be determined as a new communication route.

Then, the wireless device G 100 sends a route search response packet, which includes the identifiers of the wireless devices 100 in the new communication route from the wireless device A 100 to the wireless device G 100, to the neighboring wireless device 100 on the wireless device A 100 side in the new communication route.

For example, when the wireless device G 100 determines the communication route composed of the wireless device A 100, the wireless device C 100, the wireless device E 100, and the wireless device G 100 as a new communication route, the wireless device G 100 sends the route search response packet to the wireless device E 100 that is the neighboring wireless device 100 on the wireless device A 100 side in the new communication route.

The wireless device E 100 that receives the route search response packet finds that the identifier (A) of the wireless device A 100 included in the route search response packet does not match that (E) of the wireless device E 100. The wireless device E 100 stores the identifier (G) of the wireless device 100 included in the route search response packet and the identifier (G) of the wireless device G 100, from which the route search response packet was received, into its communication route management table 140 as the identifier of the data destination wireless device 100 and the identifier of the wireless device 100 indicating the next device to which the packet is sent. Then, the wireless device E 100 sends the route search response packet to the neighboring wireless device 100 (wireless device C) on the wireless device A 100 side in the new communication route.

The wireless device C 100 that receives the route search response packet finds that the identifier (A) of the wireless device A 100 included in the route search response packet does not match that (C) of the wireless device C 100. The wireless device C 100 stores the identifier (G) of the wireless device G 100 included in the route search response packet and the identifier (E) of the wireless device 100, from which the route search response packet was received, into its communication route management table 140 as the identifier of the data destination wireless device 100 and the identifier of the wireless device 100 indicating the next device to which the packet is sent. Then, the wireless device C 100 sends the route search response packet to the neighboring wireless device 100 (wireless device A) on the wireless device A 100 side in the new communication route.

The wireless device A 100 that receives the route search response packet finds that the identifier (A) of the wireless device A 100 included in the route search response packet matches that (A) of the wireless device A 100. The wireless device A 100 stores the identifier (G) of the wireless device G 100 included in the route search response packet and the identifier (C) of the wireless device C 100, from which the route response search packet was received, into its communication route management table as the identifier of the data destination wireless device 100 and the identifier of the wireless device 100 indicating the next device to which the packet is sent.

In this way, in the wireless communication system 200 in this embodiment, the most reliable communication route can be found from a plurality of communication routes from the wireless device A 100 to the wireless device G 100. When the wireless device A 100 sends data to the wireless device G 100, it sends the data to the wireless device C 100 according to its routing table 140. This makes it possible to send data to the wireless device G 100 via the most reliable communication route.

The wireless device A 100 wants to find a new communication route from the wireless device A 100 to the wireless device G 100 as described above, for example, in the following cases.

In the first case, the wireless device G 100 that is the destination of data is not included in the "Destination upper address" column of the routing table 140 because the wireless device A 100 sends data to the wireless device G 100 for the first time.

In the second case, though the data destination wireless device G 100 is stored in the "Destination upper address" column of its routing table 140, an attempt to send data, which will be sent to the wireless device G 100, to the wireless device 100 included in the "NextHop lower address" column fails. In this case, it is necessary to find a new communication route because an error occurs during the communication with the wireless device 100.

In this case, the source wireless device 100 that sends data to the wireless device G 100 may be the wireless device A 100 or some other wireless device 100. The source wireless device 100 is some other wireless device 100 in the following case. For example, data from a source wireless device X 100, not shown, is sent to the wireless device G 100 via a communication route composed of a wireless device Y 100, a wireless device Z 100, the wireless device A 100, the wireless device C 100, wireless device E 100, and the wireless device G 100. Assume that, when the wireless device A 100 tries to send data to the wireless device C 100, an error occurs in the communication with the wireless device C 100.

Of course, one of two actions may be taken in this case. In one case, a new communication route is re-created for the route from the wireless device A 100 to the wireless device G 100 with the communication route from the wireless device X 100 to the wireless device A 100 unchanged. In another case, the wireless device A 100 notifies the wireless device X 100, which is the data source, that the communication error occurred to allow a new communication route from the wireless device X 100 to the wireless device G 100 to be re-created.

In the latter case, the wireless device A 100 receives data from the data source wireless device X 100 via a communication route determined according to the data destination and, after that, finds an error during the communication with the wireless device (wireless device C 100) that is the next wireless device to which the data is to be sent and that is stored in its routing table 140 as an entry associated with the data destination. In this case, the wireless device A 100 sends a route no-communication notification packet, which notifies that data cannot be sent to the destination and whose final destination is the data source wireless device (wireless device X 100), to the wireless device (for example, a wireless device V 100) stored in its routing table 140 as an entry associated with the source wireless device (wireless device X 100).

The wireless device V 100 that receives the route no-communication notification packet finds that it is not the destination (wireless device X 100) of the route no-communication notification packet. Therefore, the wireless device V 100 sends the route no-communication notification packet to the wireless device (for example, wireless device W 100) which is stored in its routing table 140 as the next wireless device to which the packet is to be passed and which is an entry associated with the destination (wireless device X 100) of the route no-communication notification packet.

The wireless device W 100 that receives the route no-communication notification packet finds that it is not the destination (wireless device X 100) of the route no-communication notification packet. Therefore, the wireless device W 100 sends the route no-communication notification packet to the wireless device (for example, wireless device X 100) which is stored in its routing table 140 as the next wireless device to which the packet is to be passed and which is an entry associated with the destination (wireless device X 100) of the route no-communication notification packet.

The wireless device X 100 that receives the route no-communication notification packet finds that it is the destination of the route no-communication notification packet. Then, the wireless device X 100 sends a route search packet to the wireless devices, which can directly communicate with the wireless device X 100, using the procedure described above in order to send data to the destination (wireless device G 100) via a new communication route.

The route no-communication notification packet described above can also be sent according to the procedure described below.

First, the wireless device (wireless device A 100) receives data from the data source wireless device X 100 through the wireless devices (wireless device Y 100, wireless device Z 100) that are in a communication route determined according to the data destination and, after that, finds an error during the communication with the wireless device (wireless device C 100) that is the next wireless device to which the data is to be sent and that is stored in its routing table 140 as an entry associated with the data destination. Then, the wireless device A 100 sends a route no-communication notification packet, which notifies that data cannot be sent to the destination and whose final destination is the data source wireless device (wireless device X 100), to the wireless device (wireless device Z 100) that is the neighboring wireless device on the wireless device X 100 side in the communication route described above.

The wireless device Z 100 that receives the route no-communication notification packet finds that the identifier of the wireless device X 100 included in the route no-communication notification packet does not match its own identifier (Z). Therefore, the wireless device Z 100 sends the route no-communication notification packet to the wireless device (wireless device Y 100) that is the neighboring wireless device on the wireless device X 100 side in the communication route.

The wireless device Y 100 that receives the route no-communication notification packet finds that the identifier of the wireless device X 100 included in the route no-communication notification packet does not match its own identifier (Y). Therefore, the wireless device Y 100 sends the route no-communication notification packet to the wireless device (wireless device X 100) that is the neighboring wireless device on the wireless device X 100 side in the communication route.

The wireless device X 100 that receives the route no-communication notification packet finds that the identifier of the wireless device X 100 included in the route no-communication notification packet matches its own identifier (X). Then, the wireless device X 100 sends a route search packet to the wireless devices 100, which can directly communicate with the wireless device X 100, using the procedure described above.

As described above, when a communication error is detected in one of the wireless devices 100 in a communication route, a new route to the data destination wireless device 100 can be re-created. A new communication route re-created in this way is the most reliable communication route.

====Configuration of Wireless Device===

Next, the configuration of each wireless device 100 in this embodiment will be described with reference to FIG. 9.

As described above, the wireless device 100 in this embodiment comprises the application device 110 that performs the control operation as a home electrical appliance and the wireless terminal 120 that controls the communication with other wireless devices 100.

Of course, the wireless terminal 120 can be configured as a device separate from the application device 110 or integrated into the application device 110. When configured as a separate device, the wireless terminal 120 can also be configured as removable from the application device 110. When configured as an integrated device, the wireless terminal 120 can also be built in the application device 110.

The application device 110 and the wireless terminal 120 are connected via an I/O 113 and an I/O 124 so that they can communicate each other, and data is sent and received for information transfer between the application device 110 and the wireless terminal 120. The data is, for example, data concerning the ECHONET (registered trademark) middleware adapter communication protocol stipulated in Part 7 of the ECHONET (registered trademark) Specification Ver. 3.20.

The application device 110 is, for example, an ECHONET (registered trademark) ready device stipulated in Part 7 of the ECHONET (registered trademark) Specification Ver. 3.20.

The application device 110 comprises an application device control unit 111, an application device information acquisition unit 112, an I/O 113, and a device information table 114.

The application device control unit 111 receives application device control request data from the wireless terminal 120 via the I/O 113 for controlling the main body of the application device. For example, the application device control unit turns on or off the lighting device 106 according to the application device control request data.

The application device information acquisition unit 112 receives application device information acquisition request data from the wireless terminal 120 via the I/O 113 and sends a part or the whole of the information in the device information table 114 to the wireless terminal 120.

The I/O 113 is a communication interface via which data is transferred between the application device 110 and the wireless terminal 120. For example, the I/O 113 is an RS232C, open collector, TTL such as a communication channel via which data is transferred, one bit at a time. The I/O 113 may also be a parallel I/F or a USB.

The device information table 114 is an area in which information on electric appliances, such as device types, manufactures, models, and power supply types, is stored. FIG. 17 shows an example of the device information table 114.

The device information table 114 comprises the "device type code" column, the "manufacture code" column, the "model" column, and the "power supply type" column.

The "device type code" column is an area in which the device type of a home electric appliance is stored. The values are predetermined, for example, "0000" for the home server 101, "0001" for the specialized intermediary relay device 102, and "0002" for the air conditioning equipment 104, and those valued are stored.

The "manufacture code" column is an area in which information on the manufacture that produces a home electric appliance is stored. The values are predetermined, for example, "0001" for company A and "0002" for company B, and those valued are stored.

The "model" column is an area in which model information defined by the manufacture that produces a home electric appliance is stored.

The "power supply type" column is an area in which information as to whether the power of the application device 110 is supplied from the AC power supply or from a battery.

On the other hand, the wireless terminal 120 comprises a CPU 121, a RAM 122, a crystal oscillator 123, an I/O 124, a wireless transmission/reception unit 125, storage 126, and an antenna 127.

The CPU 121 is a unit that performs calculation processing for the operation of the wireless terminal 120. It is an operation processor that executes and processes programs stored primarily in the RAM 122 and the storage 126.

The RAM 122 is a semiconductor memory storing data that can be changed but is lost when the power is turned off. In the wireless terminal 120, this memory stores variables held by a program in operation, table information, and logs.

The crystal oscillator 123 is a device that supplies a clock signal on which the devices constituting the CPU 121 and the wireless terminal 120 operate.

The I/O 124 is a communication interface via which data is transferred between the wireless terminal 120 and the application device 110. For example, the I/O 124 is an RS232C, open collector, TTL such as a communication channel via which data is transferred, one bit at a time. The I/O 124 may also be a parallel I/F or a USB.

The wireless transmission/reception unit 125 is a device that performs wireless communication channel control, address control, modulation, and demodulation.

The antenna 127 is a device for sending and receiving radio waves to and from other wireless terminals 120. The radio wave is an electric wave or an infrared ray.

The storage 126 is a recording medium in which programs operating in the CPU 121 are stored. For example, the storage 126 may be a hard disk or a semiconductor memory.

Figure 9:
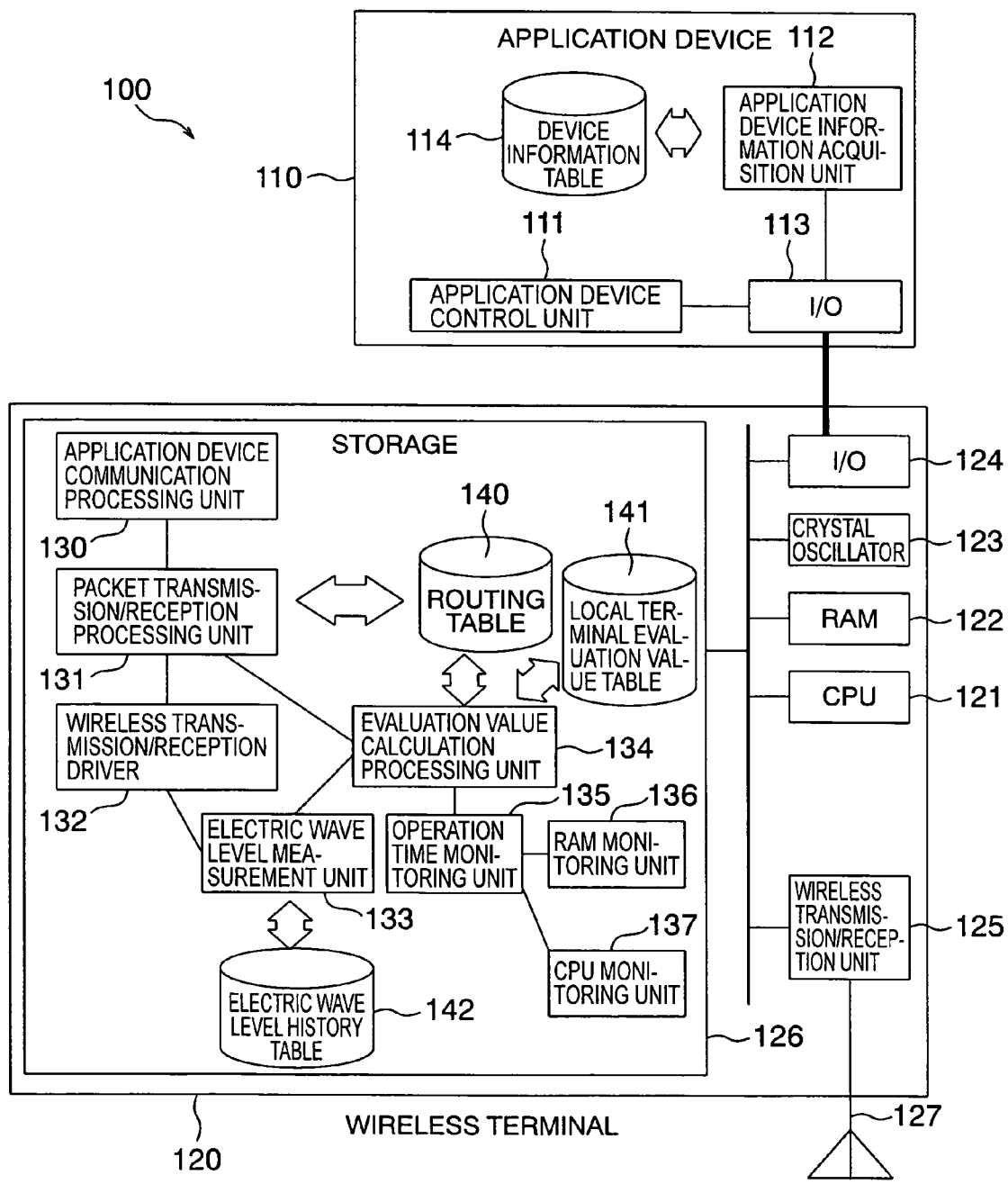
FIG. 9 is a block diagram showing the configuration of a wireless device in the embodiment.

As shown in FIG. 9, an application device communication processing unit 130, a packet transmission/reception processing unit 131, an electric wave level measurement unit 133, an evaluation value calculation processing unit 134, an operation time monitoring unit 135, a RAM monitoring unit 136, and a CPU monitoring unit 137 are implemented by executing programs, stored in the storage 126, in the CPU 121. The storage 126 also stores the routing table 140 described above, a terminal evaluation value table 141, an electric wave level history table 142, and a wireless transmission/reception driver 132.

Figure 10:
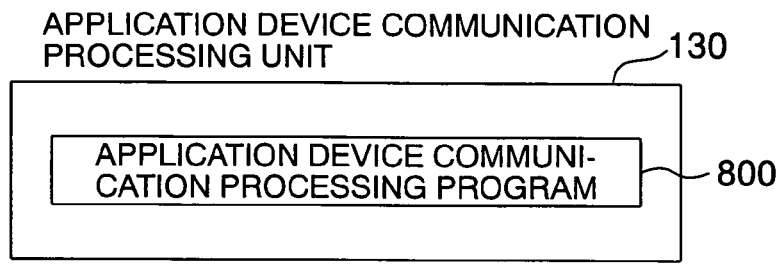
FIG. 10 is a diagram showing an application device communication processing unit in the embodiment.

As shown in FIG. 10, the application device communication processing unit 130 is implemented by an application device communication processing program 800 executed by the CPU 121. The application device communication processing unit 130 generates data that is transferred to and from the application device 110, sends and receives data, and interprets received data. For example, the ECHONET (registered trademark) middleware adapter communication processing unit stipulated in Part 7 of the ECHONET (registered trademark) Specification Ver. 3.20 can be used as the application device communication processing unit 130.

Figure 11:
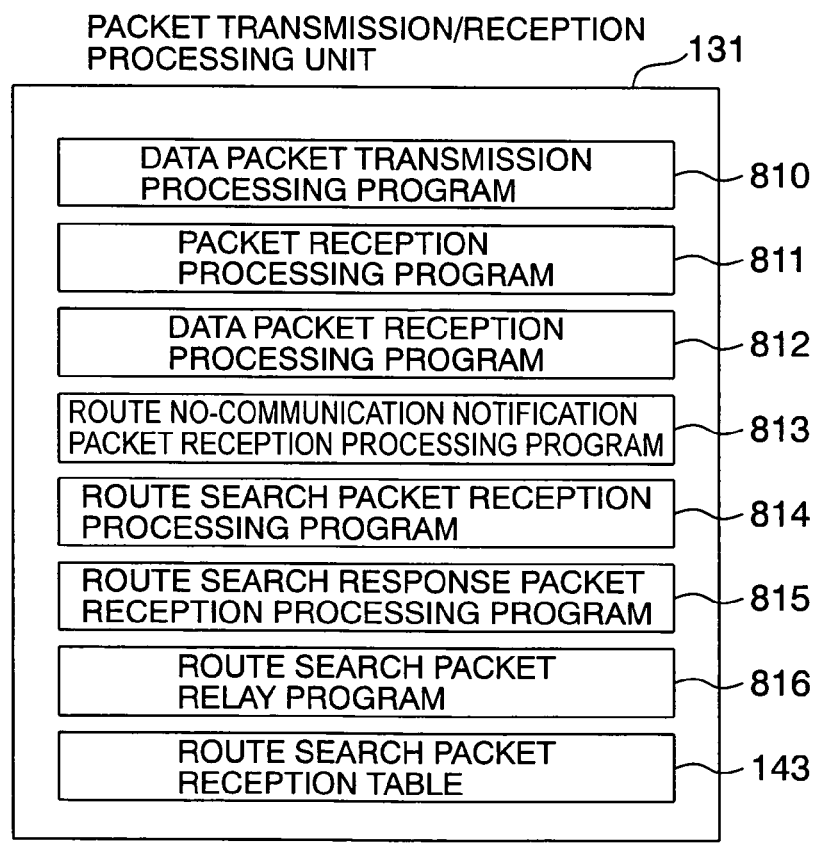
FIG. 11 is a diagram showing a packet transmission/reception processing unit in the embodiment.

As shown in FIG. 11, the packet transmission/reception processing unit 131 is implemented by a data packet transmission processing program 810, a packet reception processing program 811, a data packet reception processing program 812, a route no-communication notification packet reception processing program 813, a route search packet reception processing program 814, a route search response packet reception processing program 815, a route search packet relay program 816, and a route search packet reception table 143 that are executed by the CPU 121.

The packet transmission/reception processing unit 131 generates a data packet for transmission to other wireless devices 100 based on data received from the application device communication processing unit 130. A data packet is sent by the wireless transmission/reception driver 132. The packet transmission/reception processing unit 131 also analyzes a data packet, a route no-communication notification packet, a route search packet, and a route search response packet received from other wireless devices 100 and passes data to the application device communication processing unit 130 or the evaluation value calculation processing unit 134. The data packet, route no-communication notification packet, route search packet, and route search response packet will be described later.

The wireless transmission/reception driver 132 is a program that controls the wireless transmission/reception unit 125 to carry out communication with other wireless devices 100 via a predetermined wireless communication protocol (for example, IEEE802.11a, IEEE802.11b, IEEE802.11g, Bluetooth, specified low power radio, or IrDA communication).

Figure 12:
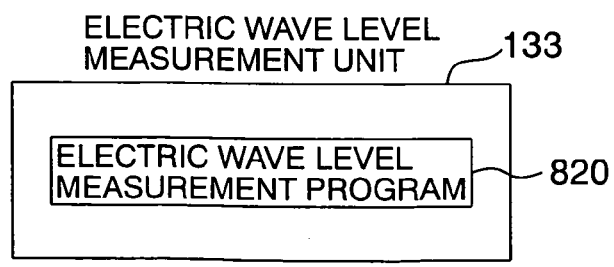
FIG. 12 is a diagram showing an electric wave level measurement unit in the embodiment.

As shown in FIG. 12, the electric wave level measurement unit 133 is implemented by an electric wave level measurement program 820 executed by the CPU 121. The electric wave level measurement unit 133 periodically sends an electric wave level measurement packet in the broadcast mode to the nearby wireless devices 100. Based on a response to the electric wave level measurement packet sent from those wireless devices 100 in the unicast mode, the electric wave level measurement unit 133 checks the strength of the radio wave sent and received to and from the wireless devices 100 and records the strengths in the electric wave level history table 142. The electric wave level measurement packet, not shown, contains the broadcast address in the destination lower address. A wireless device 100 that receives this packet returns a response.

The electric wave level history table 142 is an example of the table in which the reception history information and the electric wave level information on the wireless data received by the wireless devices 100 are stored. FIG. 19 shows the configuration of the electric wave level history table 142.

The "lower address" column contains the lower address of a wireless device 100 from which wireless data is sent to this wireless device. The "time" column contains the reception time of wireless data. The "electric wave level" column contains information indicating the strength of a radio wave for wireless communication. The unit used for the information indicating the strength of a radio wave stored in the "electric wave level" column is, for example, a decibel. Instead of a decibel, any unit that can indicate the strength of a radio wave can be used as the unit.

Figure 13:
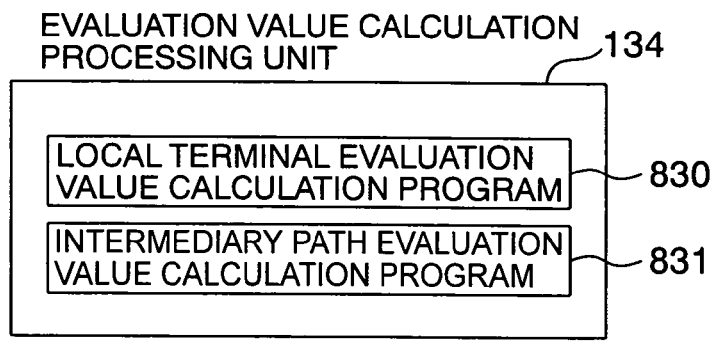
FIG. 13 is a diagram showing an evaluation value calculation processing unit in the embodiment.

As shown in FIG. 13, the evaluation value calculation processing unit 134 is implemented by a terminal evaluation value calculation program 830 and an intermediary path evaluation value calculation program 831 of the terminal executed by the CPU 121. The evaluation value calculation processing unit 134 calculates information indicating the operation ratio of the wireless communication function of its wireless device and the information indicating the reliability of the communication with the wireless devices 100 that can directly communicate with this wireless device.

Figure 14:
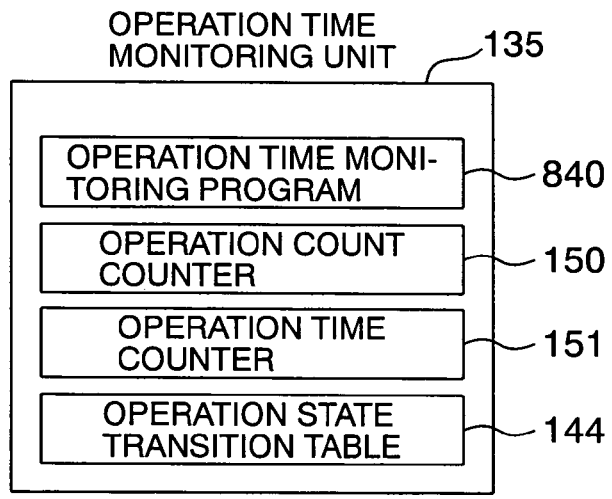
FIG. 14 is a diagram showing an operation time monitoring unit in the embodiment.

As shown in FIG. 14, the operation time monitoring unit 135 is implemented by an operation time monitoring program 840, an operation count counter 150, an operation time counter 151, and an operation state transition table 144 executed by the CPU 121.

Figure 15:
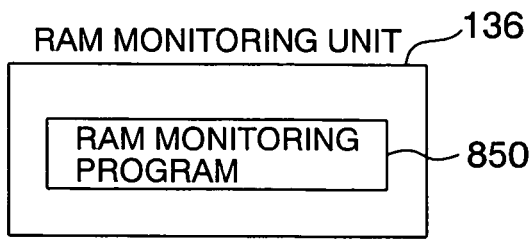
FIG. 15 is a diagram showing a RAM monitoring unit in the embodiment.

As shown in FIG. 15, the RAM monitoring unit 136 is implemented by a RAM monitoring program 850 executed by the CPU 121.

Figure 16:
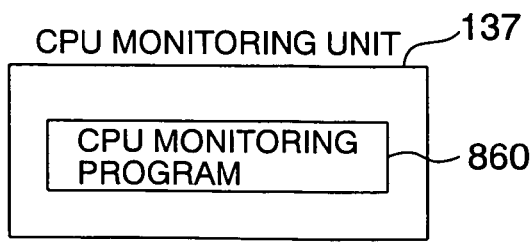
FIG. 16 is a diagram showing a CPU monitoring unit in the embodiment.

As shown in FIG. 16, the CPU monitoring unit 137 is implemented by a CPU monitoring program 860 executed by the CPU 121.

Figure 23:
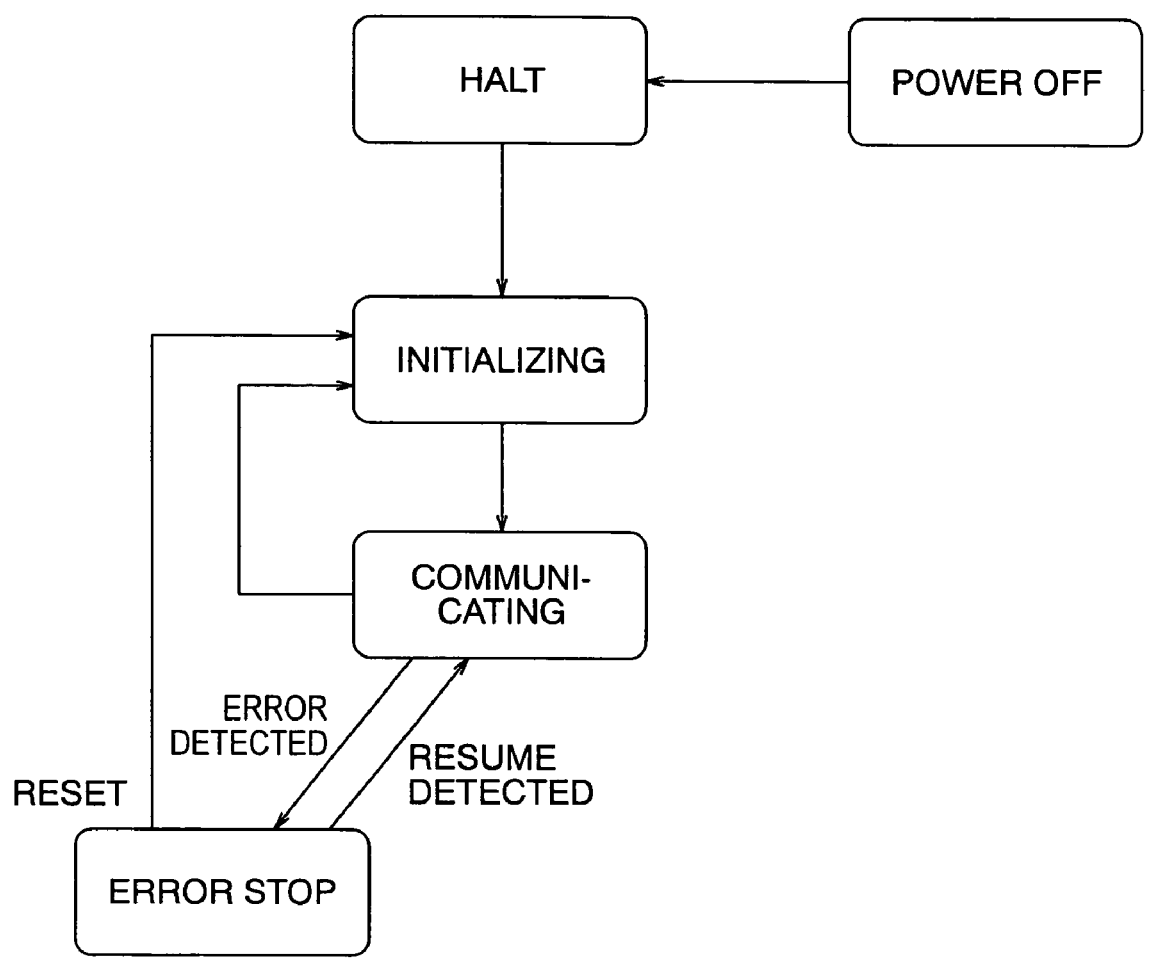
FIG. 23 is a state transition diagram of the wireless device in the embodiment.

The wireless device 100 in this embodiment operates based on the state transition shown in FIG. 23. As shown in FIG. 23, the wireless device 100 in this embodiment is in one of the following states: "halt", "initializing", "communicating", and "error stop".

"Halt" is a state in which the function of the wireless device 100 is in the halt state. The "halt" state changes when the power of the wireless device 100 is turned on. That is, the state of the wireless device 100 changes from the "halt" state to the "initializing" state. "Initializing" is a state in which the initialization processing is performed to start the function of the wireless device 100. The wireless device transits to the "initializing" state from the "halt" state or from the "communicating" or "error stop" state. "Communicating" is a state in which a packet can be sent and received to and from other wireless devices 100. The wireless communication function of the wireless device 100 is in operation while the wireless device 100 is in the "communicating" state. When the initialization processing executed during the "initializing" state is finished, the wireless device transits to the "communicating" state. "Error stop" is a state in which a communication error is detected and the packet transmission/reception processing is halted. The wireless device transits from the "communicating" state to the "error stop" state. Upon detecting that the wireless device has recovered from an error, it transits to the "communicating" state.

Figure 24:
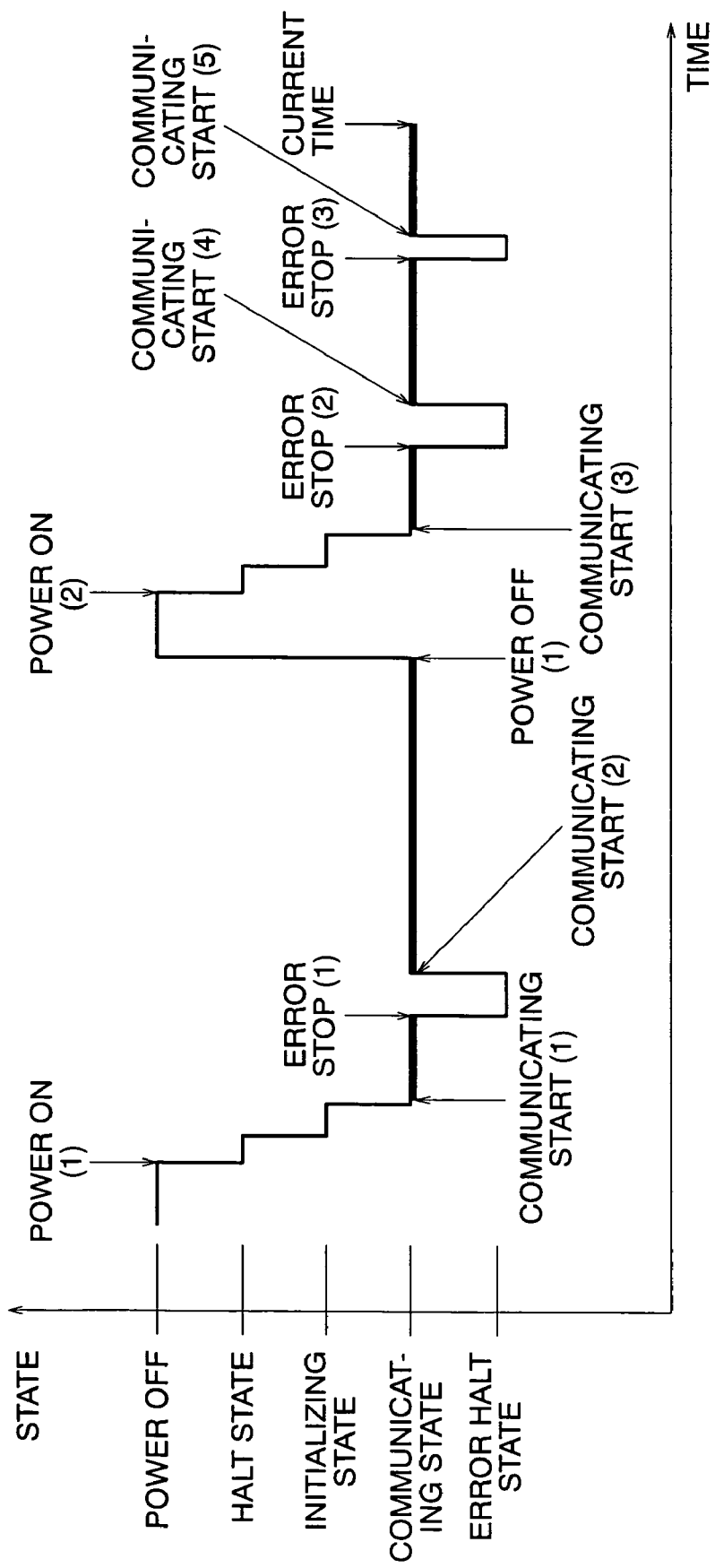
FIG. 24 is a diagram showing an example of the state transition of the wireless device in the embodiment.

FIG. 24 shows an example in which a wireless device 100 transits through the states described above from the time the wireless device 100 starts operation to the current time. The time during which the wireless device 100 is in each state is recorded in an operation state transition table 144 shown in FIG. 22. FIG. 22 shows the start times and the end times of the states of the wireless device 100 corresponding to the states in FIG. 24. By referring to the operation state transition table 144, various types of information can be calculated such as the time during which the wireless communication function is in operation, the number of times that the wireless communication state once started is halted, the operation time from the start to the end, and the time elapsed from the time that the current wireless communication function starts operation to the current time. The operation state transition table 144 can be created and updated by the operation time monitoring unit 135.

The routing table 140 is an example of a table in which routing information for transferring a data packet to a wireless device 100 is stored. FIG. 18 shows the configuration of the routing table 140.

The routing table 140 is composed of rows, each of which contains address map information on a wireless device 100, and the entries of a row. The entries of the routing table 140 are a "destination upper address" and a "NextHop lower address". The "destination upper address" is an entry containing the destination upper address of a node constituting the address map information. The "NextHop lower address" is an area that contains the destination information at a lower communication layer.

The terminal evaluation value table 141 is an example of a table used to determine the possibility that the terminal (wireless device 100) is in the "communicating" state. As the possibility that the terminal is in the "communicating" state is higher, the operation ratio of the wireless communication function is expected to be higher. FIG. 20 shows the configuration of the terminal evaluation value table 141.

The "device type" column contains the device type of the wireless device 100. The device types are, for example, the home server 101, specialized intermediary relay device 102, sensor 103, air conditioning equipment 104, portable terminal 105, and lighting devices 106 and 107. The "power supply type" column contains the type of power supply of the wireless device 100. The power supply types include 100 VAC, 100 VAC with an uninterruptible power supply unit, and a battery. The "terminal evaluation value" column contains a value indicating the possibility that the wireless device 100 corresponding to the "device type" column is in the "communicating" state. For example, a value in the range from "0" to "1" is determined and stored. Referring to FIG. 20, the values are as follows: "0.95" for the home server 101, "1.0" or "0.95" for the specialized intermediary relay device 102 depending upon the power supply type, "0.5" or "0.95" for the sensor 103 depending upon the power supply type, "0.7" for the air conditioning equipment 104, and "0.6" for the lighting device 106 and lighting device 107.

===About Packets===

Next, packets transferred between the wireless devices 100 in this embodiment will be described with reference to FIG. 25 to FIG. 28.

Packets transferred between the wireless devices 100 include a data packet 600, a route no-communication notification packet 610, a route search packet 620, and a route search response packet 630.

The data packet 600 is a packet used to transfer the control data, state data, image data, and streaming data of an application.

The route no-communication notification packet 610 is a packet sent to the wireless device 100, from which a data packet 600 is received, to notify that a no-communication is found. This route no-communication notification packet is sent when the wireless device 100 tries to send a data packet 600, which will be sent to the destination wireless device 100, to the next wireless device 100 in the communication route but finds a no-communication (detects an error).

The route search packet 620 is a packet sent by the wireless device 100, which will send a data packet 600, to search for a communication route along which the data packet 600 will be sent to the destination wireless device 100.

The route search response packet 630 is a packet sent by the destination wireless device 100 of a data packet 600 to notify a determined communication route to the wireless devices 100 in the communication route.

Each packet has a common header composed of the "source lower address", "destination lower address", and "packet type".

The "source lower address" is an area containing the lower address of the packet source, that is, the lower address of the wireless device itself. For example, a one-byte lower address indicating the source, one of "A" to "G", is stored.

The "destination lower address" is an area containing the lower address of the next wireless device 100 to which the packet is sent. For example, a one-byte lower address indicating the destination, one of "A" to "G", is stored. When a specific value defined as the lower broadcast address is specified for the destination lower address, all wireless devices 100 that can wirelessly receive this packet receive the packet.

The "packet type" is an area containing packet type information. A one-byte unique value is stored for each packet type: for example, "0x00" for the data packet 600, "0x01" for the route no-communication notification packet 610, "0x02" for the route search packet 620, and "0x03" for the route search response packet 630.

Next, the data packet 600 will be described.

Figure 25:
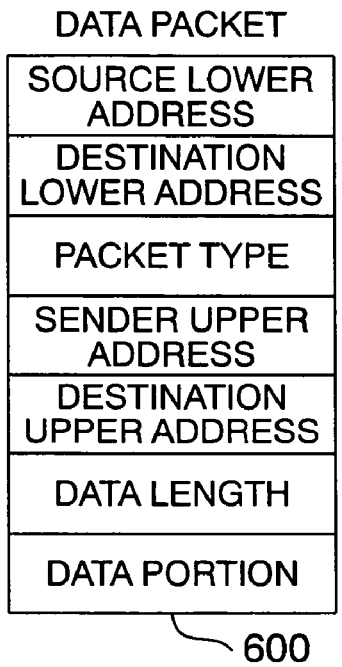
FIG. 25 is a diagram showing a data packet in the embodiment.

In addition to the header described above, the data packet 600 comprises the "sender upper address", "destination upper address", "data length", and "data portion". FIG. 25 shows the data packet 600.

The "sender upper address" is an area containing the upper address of the wireless device 100 that stored data in the "data portion" of the data packet 600.

The "destination upper address" is an area containing the upper address of the wireless device 100 to which the data in the "data portion" of the data packet 600 is to be passed, that is, the destination of the data.

The "data length" is an area containing the size of the data stored in the "data portion", for example, the number of bytes of the data.

The "data portion" is an area containing the application control data, state data, or image data.

Next, the route no-communication notification packet 610 will be described.

Figure 26:
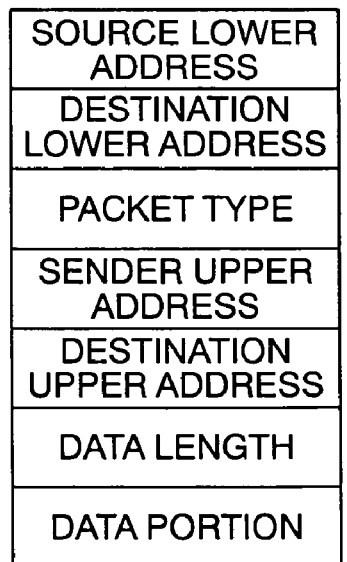
FIG. 26 is a diagram showing a route no-communication notification packet in the embodiment.

In addition to the header described above, the route no-communication notification packet 610 comprises the "sender upper address", "destination upper address", "data length", and "data portion". FIG. 26 shows the route no-communication notification packet 610.

The "sender upper address" is an area containing the upper address of the wireless device 100 that stored data in the "data portion" of the data packet 600.

The "destination upper address" is an area containing the upper address of the wireless device 100 to which the data in the "data portion" of the data packet 600 is to be passed, that is, the destination wireless device 100.

The "data length" is an area containing the size of the data stored in the "data portion", for example, the number of bytes of the data.

The "data portion" is an area containing application control data, state data, or image data in the "data portion" of the data packet 600 that did not reach the destination.

Next the route search packet 620 will be described.

Figure 27:
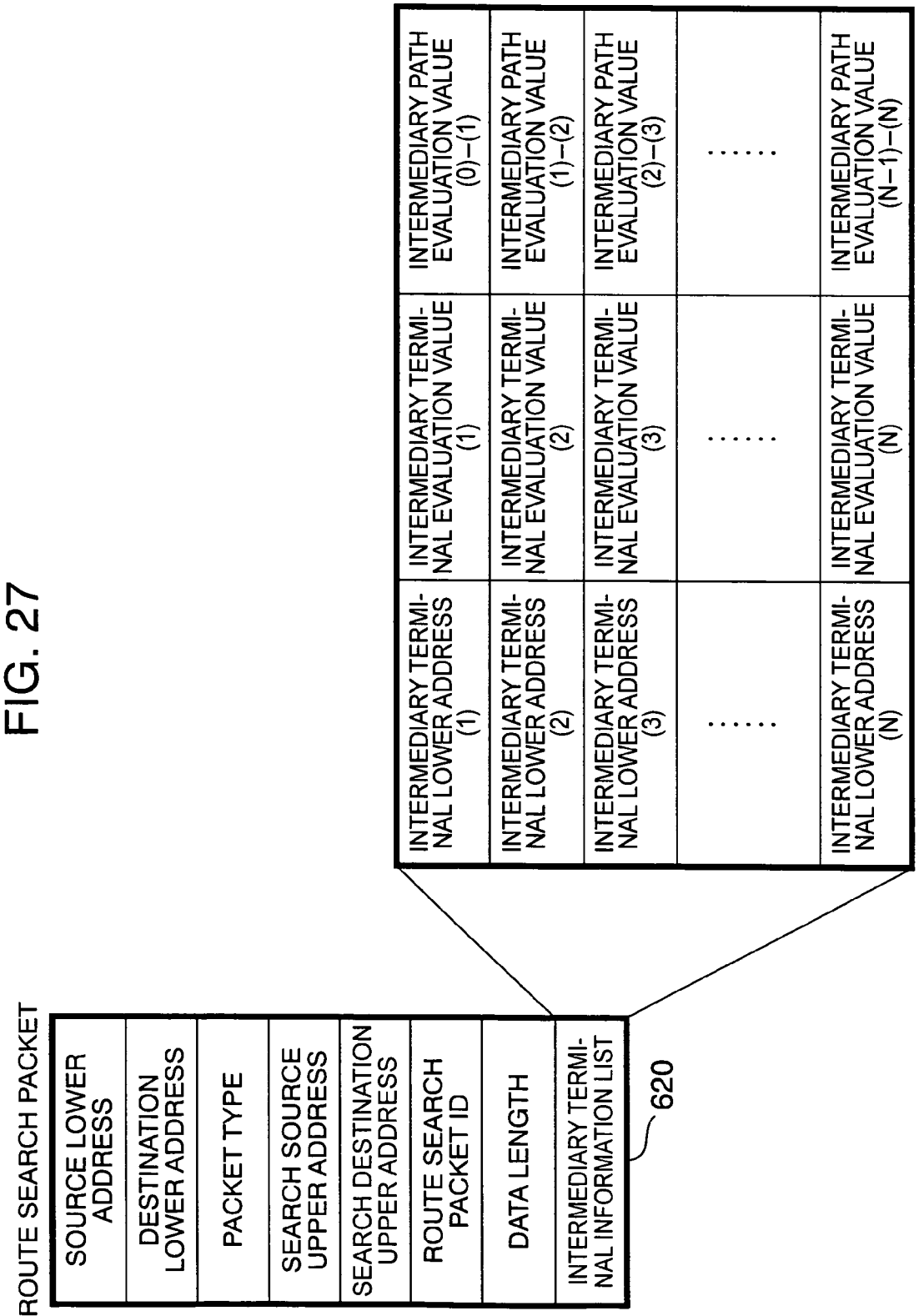
FIG. 27 is a diagram showing a route search packet in the embodiment.

In addition to the header described above, the route search packet 620 comprises the "search source upper address", "search destination upper address", "route search packet ID", "data length", and "intermediary terminal information list". FIG. 27 shows the route search packet 620.

The "search source upper address" is an area containing the upper address of the wireless device 100 that issued the route search packet 620, that is, the wireless device 100 that tried to search for a new communication route.

The "search destination upper address" is an area containing the upper address of the search destination wireless device 100 for which a communication route is to be found, that is, the destination wireless device 100 of the data packet 600, using the route search packet 620.

The "route search packet ID" is an area in which the wireless device 100, specified by the "sender upper address" column of the route search packet 620, stores a value to identify the identity of the route search packet 620.

The "data length" contains the data size, for example, the number of bytes, of the "intermediary terminal information list".

The "intermediary terminal information list" is an area containing a list of information on the terminals, that is, the wireless devices 100 in a communication route. When the wireless device 100 that receives the route search packet 620 broadcasts a new route search packet 620, the wireless device 100 adds its intermediary terminal information to the "intermediary terminal information list".

The "intermediary terminal information list" is stored as a set of the "intermediary terminal lower address", "intermediary terminal evaluation value", and "intermediary path evaluation value".

The "intermediary terminal lower address" is an area in which the lower address of the wireless device 100, that is, its identifier, is stored when the wireless device 100 receives the route search packet 620 and broadcasts a new route search packet 620.

The "intermediary terminal evaluation value" is an area that contains the evaluation value of a wireless device, that is, the operation ratio of its wireless communication function. This evaluation value is used to determine whether or not a wireless device, which receives the route search packet 620 and broadcasts a new route search packet 620, will be selected as an intermediary relay device that receives the data packet 600 in a communication route from the wireless device 100 specified by the search source upper address to the wireless device 100 specified by the search destination upper address.

The "intermediary path evaluation value" is an area containing the evaluation value of the path between a wireless device 100, which sends the route search packet 620 to this wireless device 100, and this wireless device 100, that is, information indicating the reliability of communication between another wireless device 100, which sends the route search packet 620 to this wireless device, and this wireless device 100.

Next, the route search response packet 630 will be described.

Figure 28:
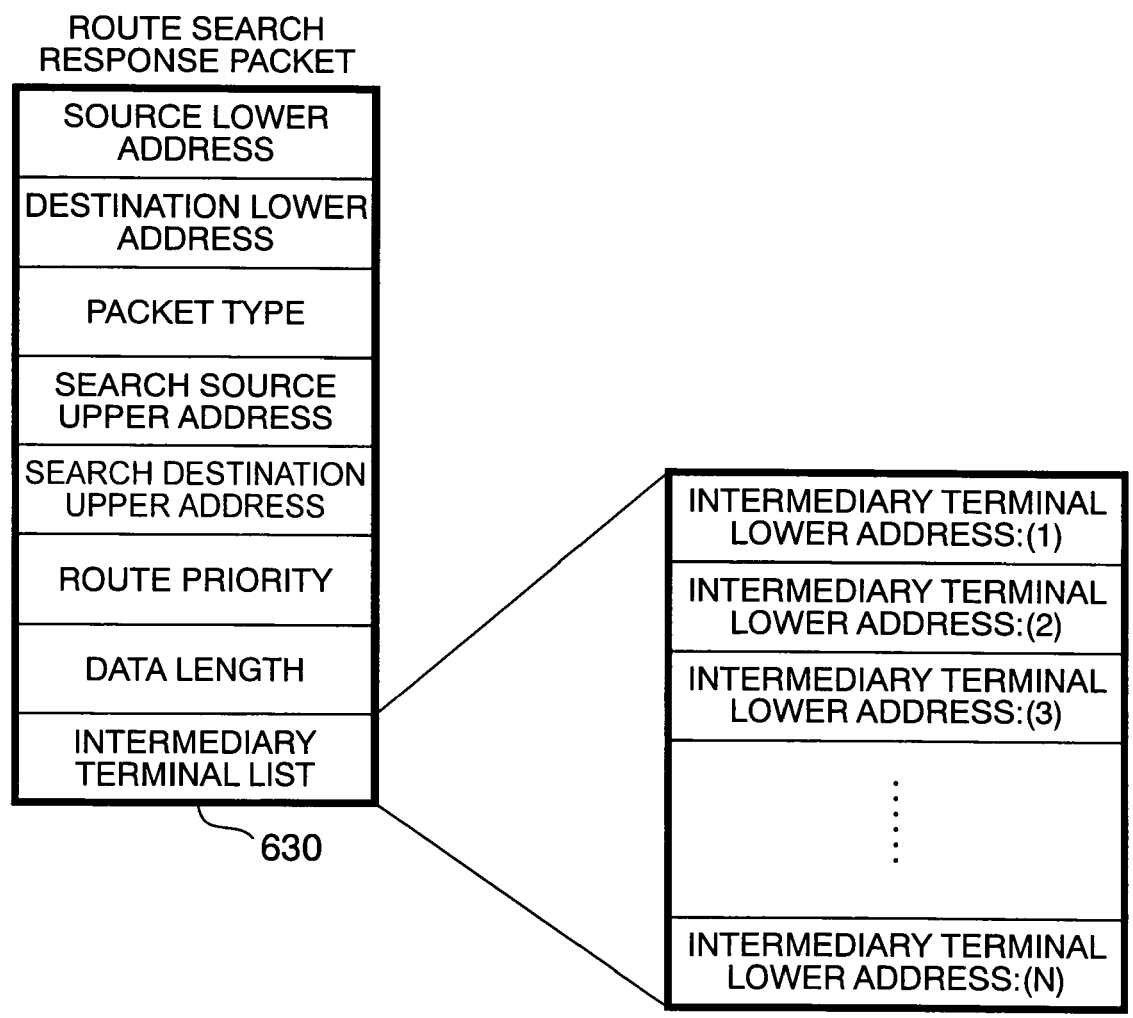
FIG. 28 is a diagram showing a route search response packet in the embodiment.

In addition to the header described above, the route search response packet 630 comprises the "search source upper address", "search destination upper address", "route priority", "data length", and "intermediary terminal list". FIG. 28 shows the route search response packet 630.

The wireless device 100 that relays the route search response packet 630 updates its routing table 140 based on the information in the "intermediary terminal list" of the received route search response packet 630 and sends the packet to the next wireless device 100.

The "search source upper address" is an area containing the upper address of the wireless device 100 that issued the route search packet 620 corresponding to the route search response packet 630.

The "search destination upper address" is an area containing the upper address of the destination wireless device 100 for which a communication route is to be found using the route search packet 620 corresponding to the route search response packet 630.

The "route priority" is an area containing information indicating the priority of reliability of the communication route, identified by the intermediary terminal list in the route search response packet 630, among all communication routes.

The "data length" is an area containing the data size of the "intermediary terminal list".

The "intermediary terminal list" is an area containing a list of lower addresses of the wireless devices 100 in the communication route selected by the wireless device 100 specified by the search destination upper address of the route search response packet 630, that is, the identifiers of the wireless devices 100 in the new communication route from the search source wireless device 100 to the search destination wireless device 100.

===Processing Flow of Packet Transmission and Reception===

Next, the flow of the packet transmission/reception processing performed by the packet transmission/reception processing unit 131 will be described with reference to the flowcharts in FIG. 29 to FIG. 40.

Figure 29:
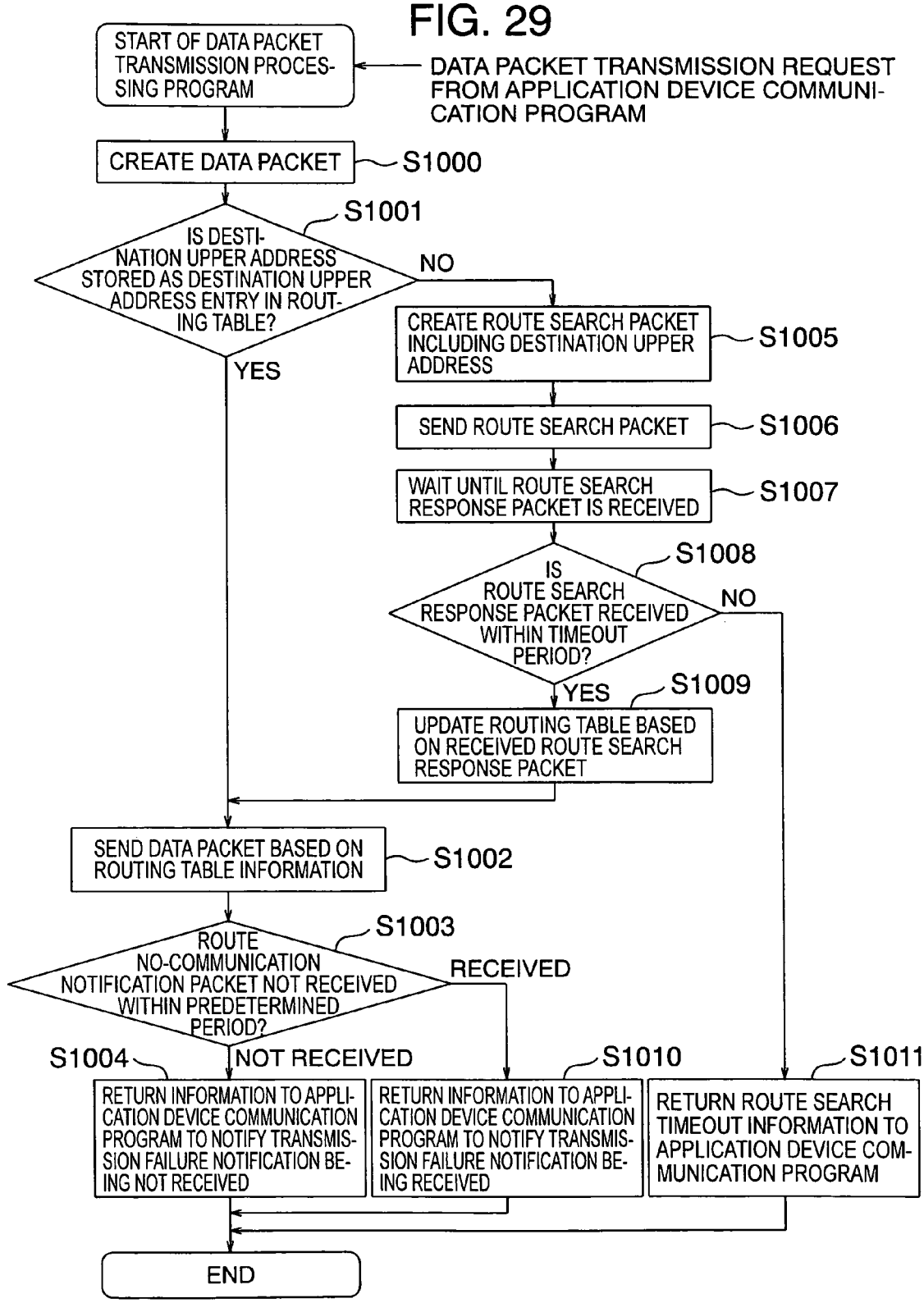
FIG. 29 is a flowchart showing the flow of data packet transmission processing in the embodiment.

First, FIG. 29 shows the flow of processing performed when a data packet 600 is sent to another wireless device 100 in response to a data packet transmission request from the application device communication processing unit 130.

In response to a data packet transmission request from the application device communication processing program 800, the data packet transmission processing program 810 starts processing. A data packet is created based on the information passed via the data packet transmission request (S1000). Whether the destination upper address of the data packet 600 is included in the destination upper address entries of the routing table 140 is checked (S1001) and, if such an entry is found, control is passed to the path indicated by "Yes" and the data packet 600 is sent based on the routing table information (S1002).

If such an entry is not found, control is passed to the path indicated by "No" and a route search packet 620, which includes the destination upper address as the search destination upper address, is created (S1005). The program sends the created route search packet 620 (S1006) and waits until the route search response packet 630 is received (S1007).

Next, whether the route search response packet 630 is received within a pre-set timeout time is checked (S1008). If the route search response packet 630 is received within the timeout time, the routing table 140 is updated based on the route search response packet 630 (S1009). If the route search response packet 630 is not received within the pre-set timeout time, the route search timeout information, that is, information indicating that the route search response packet 630 is not received within the predetermined timeout time, is returned to the application device communication program 800 (S1011) and the processing is terminated.

After sending the data packet 600 in S1002, whether or not the route no-communication notification packet 610 is received within a predetermined period is checked (S1003).

If the route no-communication notification packet 610 is not received within the predetermined time, the information indicating that the transmission failure notification is not received, that is, the information indicating that the route no-communication notification packet 610 is not received within the predetermined time, is returned to the application device communication program 800 (S1004) and the processing is terminated.

On the other hand, if the route no-communication notification packet 610 is received within the predetermined time, the information indicating that the transmission failure notification is received, that is, the information indicating that the route no-communication notification packet 610 is received within the predetermined time, is returned to the application device communication program 800 (S1010) and the processing is terminated.

Figure 30:
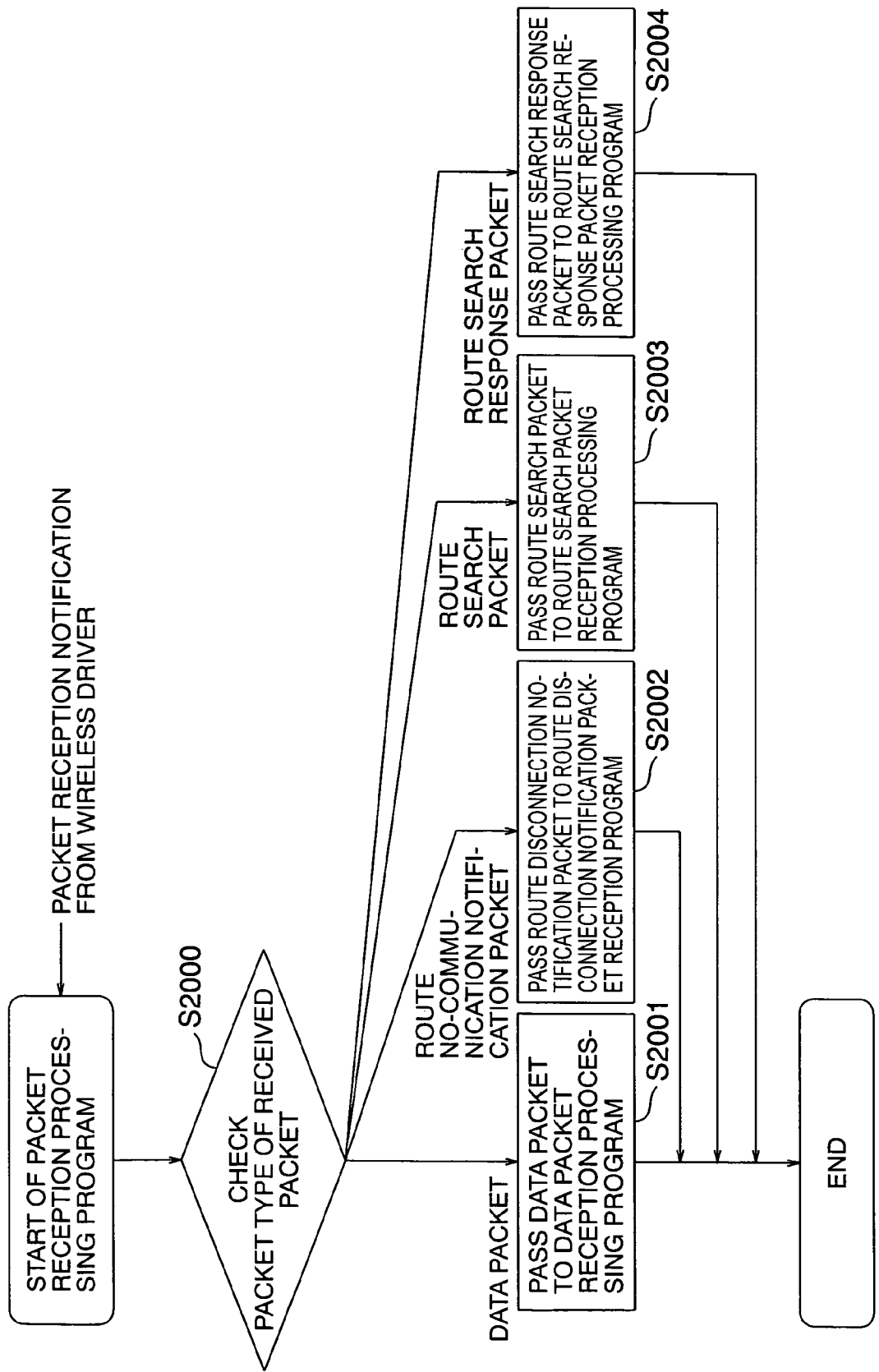
FIG. 30 is a flowchart showing the flow of packet reception processing in the embodiment.

Next, FIG. 30 shows the flow of the processing in which the packet transmission/reception processing unit 131 analyzes and processes a packet sent from another wireless device 100 and received by the wireless transmission/reception driver 132.

In response to a packet reception notification from the wireless transmission/reception driver 132, the packet reception processing program 811 starts processing.

First, the packet type of the received packet is checked (S2000). If the packet type is the data packet 600, the data packet 600 is passed to the data packet reception processing program 812 (S2001) and the processing is terminated.

If the packet type is the route no-communication notification packet 610, the route no-communication notification packet 610 is passed to the route no-communication notification packet reception processing program 813 (S2002) and the processing is terminated.

If the packet type is the route search packet 620, the route search packet 620 is passed to the route search packet reception processing program 814 (S2003) and the processing is terminated.

If the packet type is the route search response packet 630, the route search response packet 630 is passed to the route search response packet reception processing program 815 (S2004) and the processing is terminated.

Figure 31:
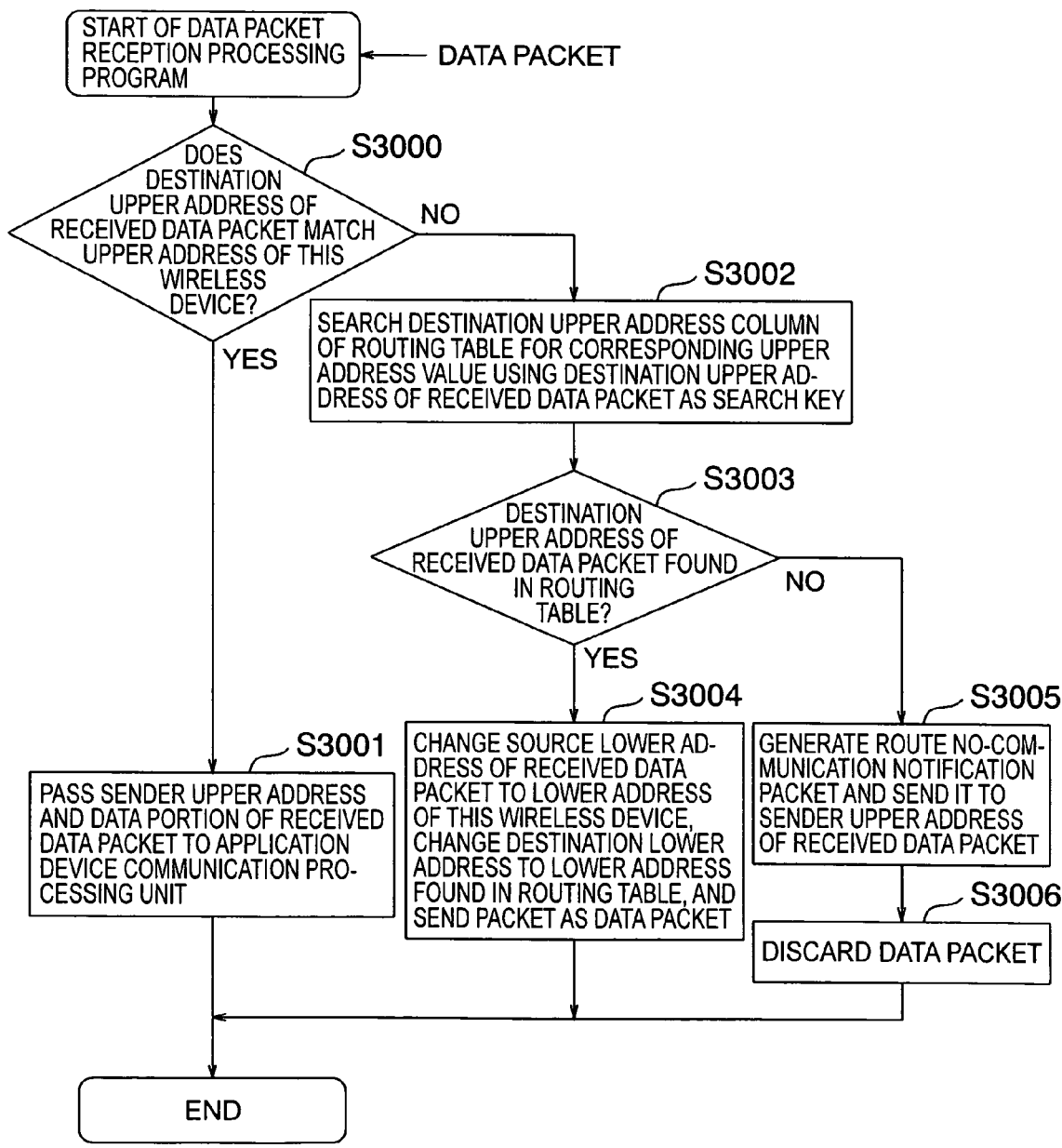
FIG. 31 is a flowchart showing the flow of data packet reception processing in the embodiment.

Next, FIG. 31 shows the flow of the data packet reception processing program 812.

When a data packet 600 is passed from the packet reception processing program 811, the data packet reception processing program 812 starts processing.

First, whether or not the destination upper address of the received data packet 600 matches the upper address of this wireless device is checked (S3000). If they match, the sender upper address and the data portion of the received data packet 600 are passed to the application device communication processing unit 130 and the processing is terminated (S3001).

If they do not match, the program searches the destination upper address column of the routing table 140 for the corresponding upper address using the destination upper address of the received data packet 600 as the search key (S3002). Whether or not the destination upper address of the received data packet 600 is found in the routing table 140 is checked (S3003). If such a destination upper address is found, the source lower address of the received data packet 600 is changed to the lower address of this wireless device and the destination lower address is changed to the lower address found in the routing table 140. Then, the data packet 600 is sent to the wireless device 100 specified by the destination lower address (S3004). If no such destination upper address is found, a route no-communication notification packet 610 is generated and is sent to the wireless device 100 specified by the sender upper address of the received data packet 600 (S3005). The data packet 600 is discarded (S3006) and the processing is terminated.

Figure 32:
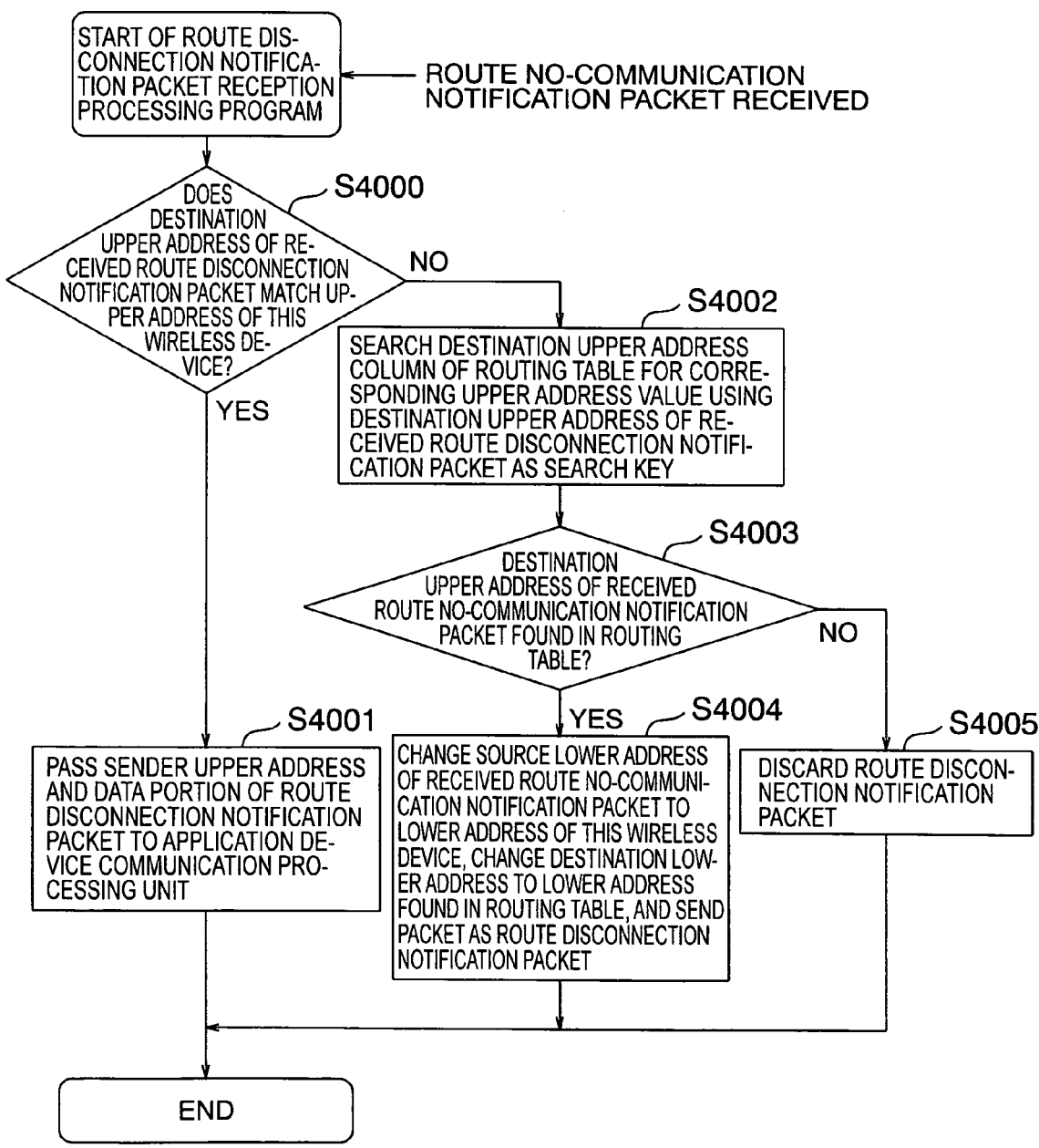
FIG. 32 is a flowchart showing the flow of route no-communication notification packet reception processing in the embodiment.

Next, FIG. 32 shows the flow of the route no-communication notification packet reception processing program 813.

First, when a route no-communication notification packet 610 is passed from the packet reception processing program 811, the route no-communication notification packet reception processing program 813 starts processing.

Whether or not the destination upper address of the received route no-communication notification packet 610 matches the upper address of this wireless device is checked (S4000). If they match, the sender upper address and the data portion of the received route no-communication notification packet 610 are passed to the application device communication processing unit 130 and the processing is terminated (S4001).

If they do not match, the program searches the destination upper address column of the routing table 140 for the corresponding upper address using the destination upper address of the received route no-communication notification packet 610 as the search key (S4002). Whether or not the destination upper address of the received route no-communication notification packet 610 is found in the routing table 140 is checked (S4003). If such a destination upper address is found, the source lower address of the received route no-communication notification packet 610 is changed to the lower address of this wireless device and the destination lower address is changed to the lower address found in the routing table 140. Then, the route no-communication notification packet is sent to the wireless device 100 specified by the lower address found in the routing table 140 (S4004). If no such destination upper address is found, the route no-communication notification packet 610 is discarded (S4005).

Figure 33:
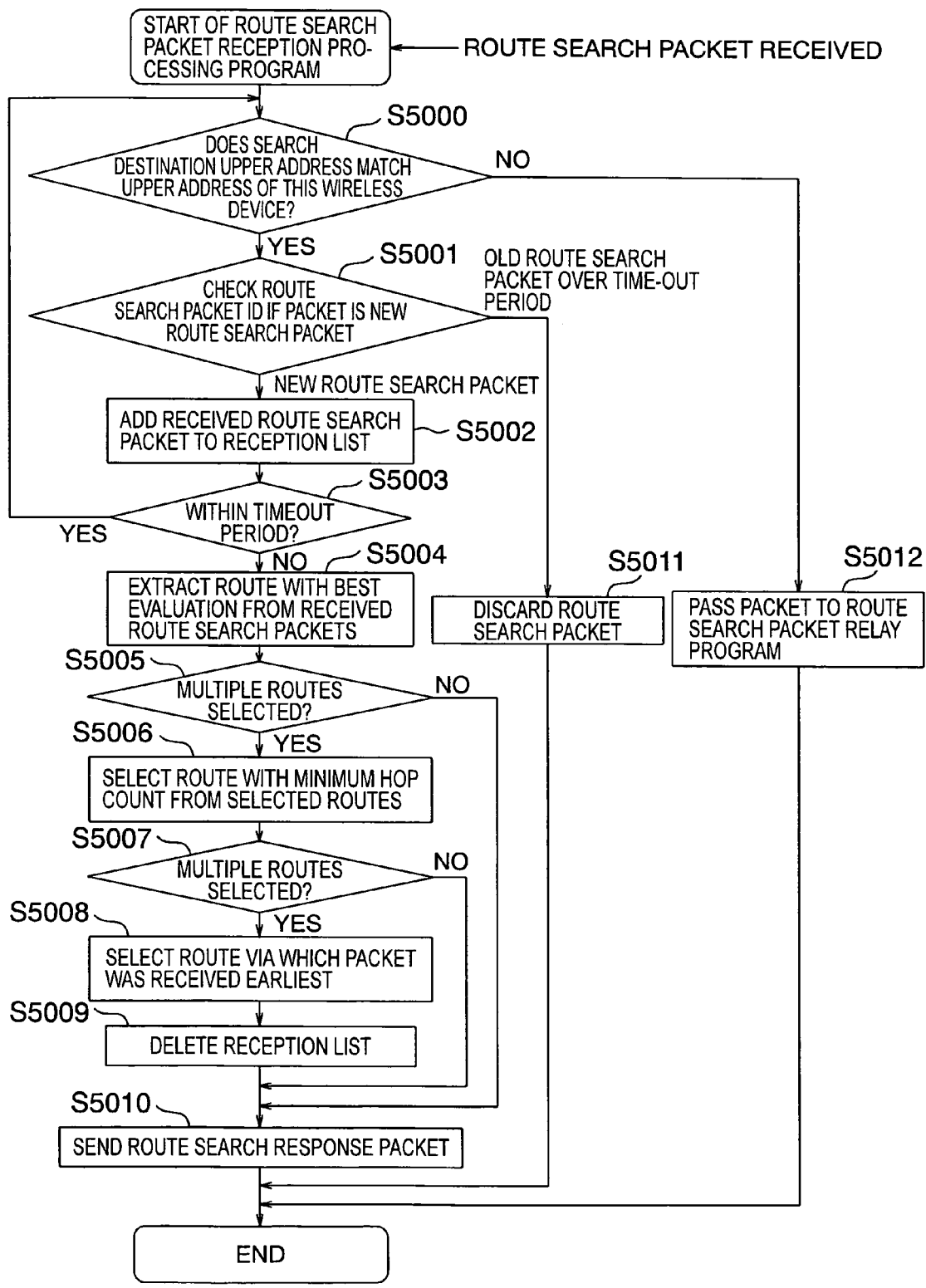
FIG. 33 is a flowchart showing the flow of route search packet reception processing in the embodiment.

Next, FIG. 33 shows the flow of the route search packet reception processing program 814.

When a route search packet 620 is passed from the packet reception processing program 811, the route search packet reception processing program 814 starts processing.

First, whether the search destination address of the received route search packet 620 matches the upper address of this wireless device is checked (S5000). If the destination upper address of the received route search packet 620 matches the upper address of this wireless device, the program checks the route search packet ID 403 of the received route search packet 620 if the packet is a new route search packet 620 (S5001). If the packet is a new route search packet 620, control is passed to S5002. If the packet is an old route search packet 620 that has been timed out, control is passed to S5011. The timed-out, old route search packet 620 is discarded (S5011). If the search destination upper address of the received route search packet 620 does not match the upper address of this wireless device, the route search packet 620 is passed to the route search packet relay program 816 and the processing is terminated.

Next, in step S5002, the received new route search packet 620 is added to the reception list, that is, to the route search packet reception table 143. FIG. 21 shows the route search packet reception table 143. In the route search packet reception table 143, the route search packet ID, the reception time, and hop count are recorded for each received route search packet 620.

Next, whether the timeout time has elapsed is checked (S5003) and, if the timeout time is not elapsed, control is passed back to S5000. The timeout time is a time during which a route search packet 620 which is sent to this wireless device via various communication routes and whose destination is this wireless device can be accepted. Any time can be set as the timeout time.

If the timeout time is elapsed, the route with the best evaluation is extracted from the received route search packets 620 (S5004). That is, for each of the route search packets 620 which are sent to this wireless device via various communication routes and whose destination is this wireless device, the information indicating the reliability of the communication route is calculated based on the information indicating the operation ratio of the wireless devices 100, the information indicating the reliability of the communication, and the information indicating the reliability of the communication between the wireless device 100, from which the route search packet 620 is received, and this wireless device. Then, based on the reliabilities of the communication routes, a new communication route is determined for sending data from the search source wireless device 100 in the communication route to this wireless device. At this time, whether multiple communication routes are selected is checked (S5005). This is because, in some cases, there are two or more communication routes with the same calculated reliability information. If there are two or more communication routes with the same reliability information, control is passed to the path indicated by "Yes". Out of those communication routes, the communication route with the minimum number of wireless devices 100, that is, with the minimum hop count, is determined to be a new communication route (S5006). If there are no multiple communication routes with the same reliability information, control is passed to the path indicated by "No".

In addition, in S5007, whether there are two or more communication routes with the minimum hop count described above is checked (S5007). If there are two or more such routes, the communication route via which the route search packet received earliest is sent is determined as a new communication route (S5008). Once the communication route is determined as described above, the route search packet reception table 143 is deleted (S5009).

In this embodiment, which route search packet 620 is received earliest is determined for the communication routes with the same hop count. Alternatively, it is also possible to check the communication routes, via which the route search packet 620 is received at the same time, to determine which communication route has the minimum hop count.

Figure 34:
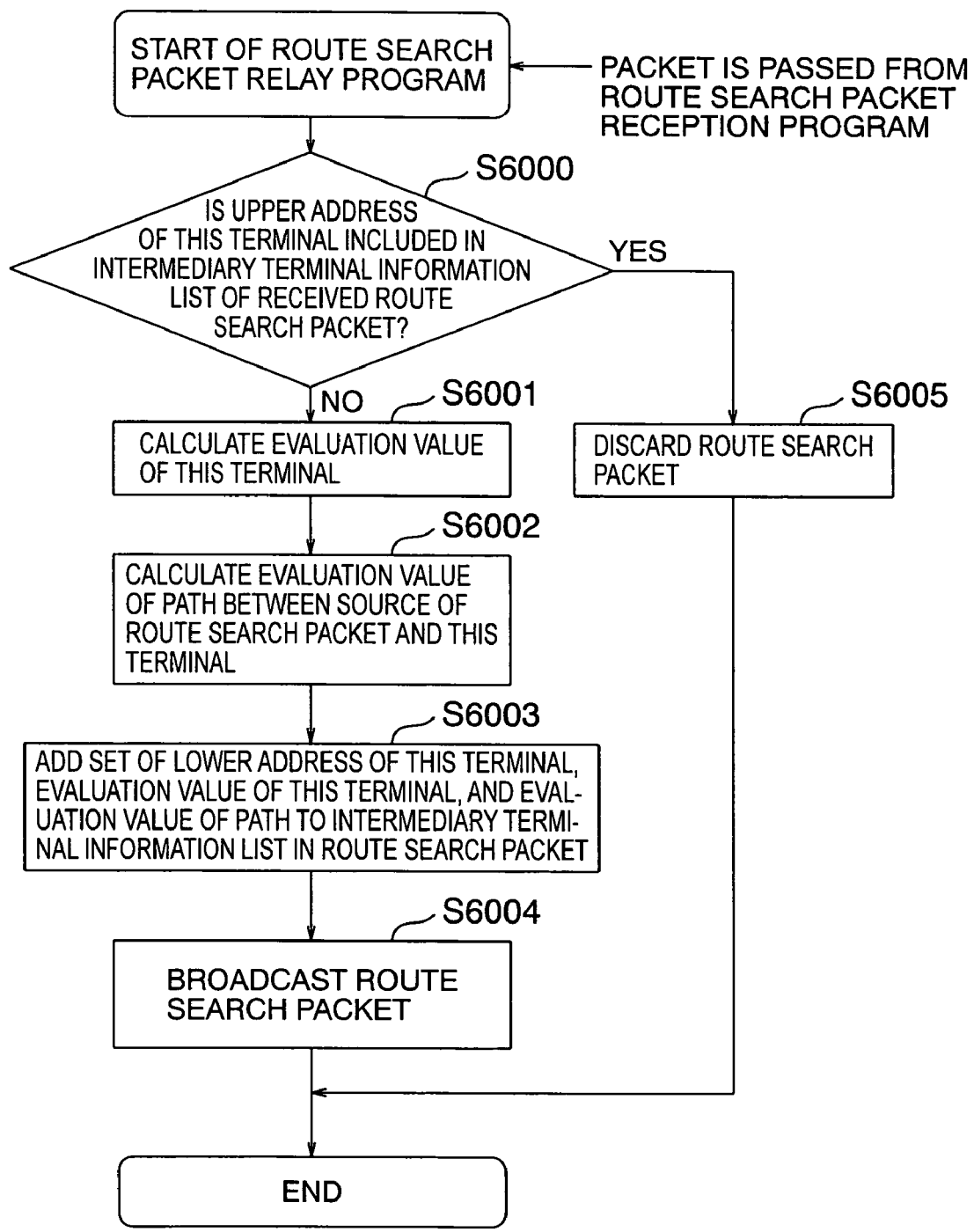
FIG. 34 is a flowchart showing the flow of route search packet relay processing in the embodiment.

Next, FIG. 34 shows the flow of the route search packet relay program 816.

When a route search packet 620 is passed from the packet reception processing program 811, the route search packet relay program 816 starts processing.

First, whether the upper address of this wireless device is included in the intermediary terminal information list of the received route search packet 620 is checked (S6000). If the upper address of this wireless device is not found, control is passed to the path indicated by "No".

On the other hand, if the upper address of this wireless device is included, the route search packet 620 is discarded and the processing is terminated (S6005). This is because the presence of the upper address of this wireless device in the intermediary terminal information list means that the route search packet 620 relayed or sent by this wireless device before is received.

If the upper address of this wireless device is not included in the intermediary terminal information list, the evaluation value of this terminal, that is, the information indicating the operation ratio of its wireless communication function is calculated (S6001). As described above, the information indicating the operation ratio of its wireless communication function is, for example, the information indicating the ratio of the wireless communication function operation time to the time elapsed from the time that the wireless communication function is first started to the current time. Alternatively, the information indicating the operation ratio of the wireless communication function is, for example, the information indicating the ratio of the number of wireless communication function operations, whose operation time elapsed from the start to the end is longer than the time elapsed from the start of the currently-active wireless communication function operation to the current time, to the number of wireless communication function operations that were once started and ended during the period of time from the time the wireless communication function first stated operation to the current time.

The flow of processing for calculating the evaluation value of a terminal will be described with reference of FIG. 38 and FIG. 39. The evaluation value of a terminal can be calculated by referring to the operation state transition table 144 shown in FIG. 22.

Figure 38:
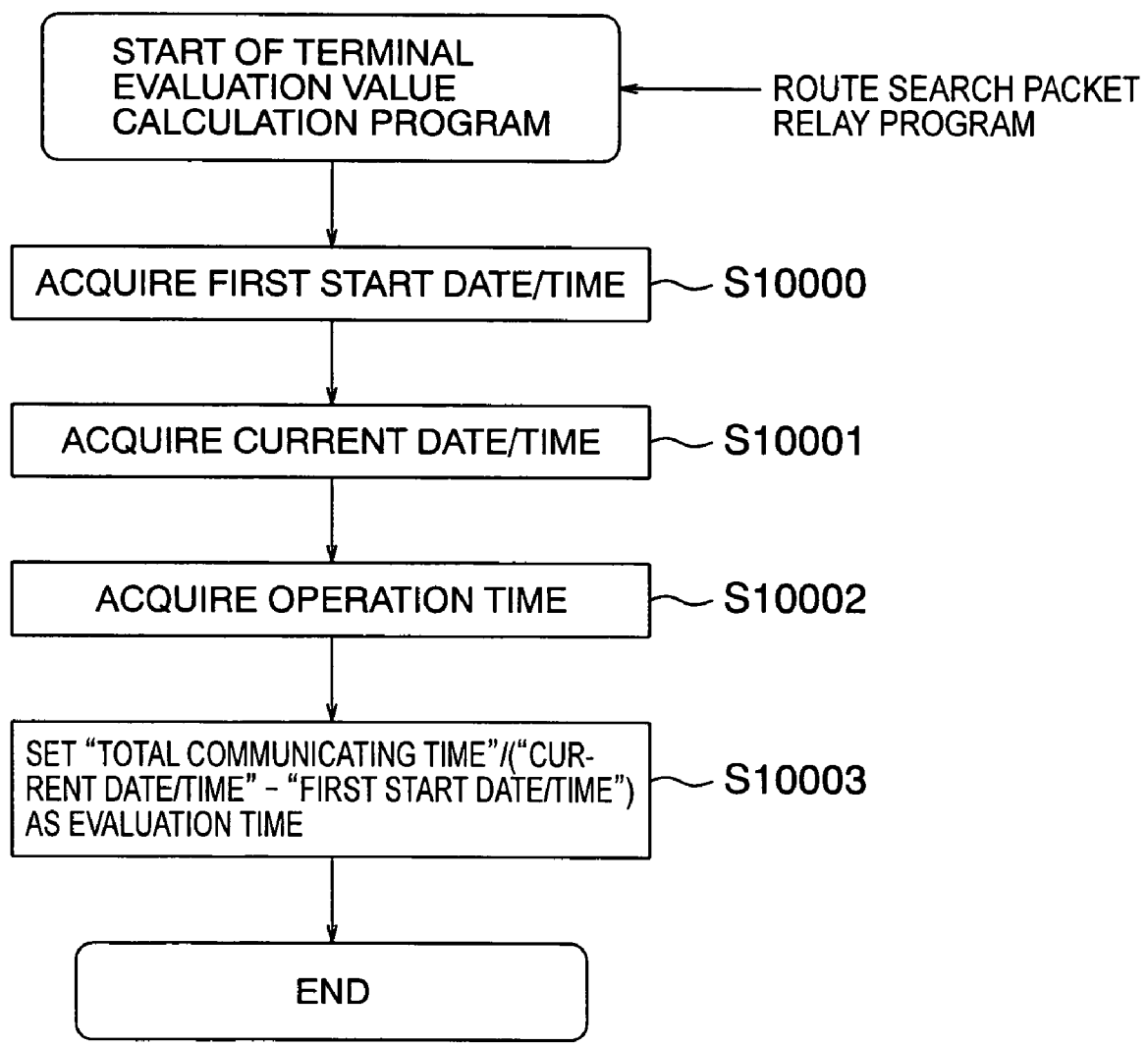
FIG. 38 is a flowchart showing the flow of terminal evaluation value calculation processing in the embodiment.

First, FIG. 38 shows an example of the flow of processing for calculating the evaluation value of a terminal in the former case described above.

In response to an evaluation value calculation request from the route search packet relay program 816 (that is, when S6001 in FIG. 34 is executed), the terminal evaluation value calculation program 830 of the terminal shown in FIG. 38 starts processing.

First, the first start date/time is acquired (S10000). The first start date/time is the start date/time of the first operation of this wireless device. The first start date/time is the start time of the first "halt" state in the operation state transition table 144. In the example in FIG. 22, the first start date/time is 7:23:10 on May 12, 2003. Then, the current date/time is acquired (S10001). After that, the operation time stored in the operation time counter 151 of the operation time monitoring unit 135 is acquired (S10002). The operation time is the total time during which the wireless device 100 is in the "communicating" state. For example, in the timing diagram shown in FIG. 24, the operation time (total communication operation time) is the total of the time from "communicating start (1)" to "error stop (1)", the time from "communicating start (2)" to "Power Off(1)", the time from "communicating start (3)" to "error stop (2)", the time from "communicating start (4)" to "error stop (3)", and the time from "communicating start (5)" to the current time.

Then, the ratio of the total communicating time to the time from the first start date/time to the current date/time is calculated as the evaluation time (S10003).

Figure 39:
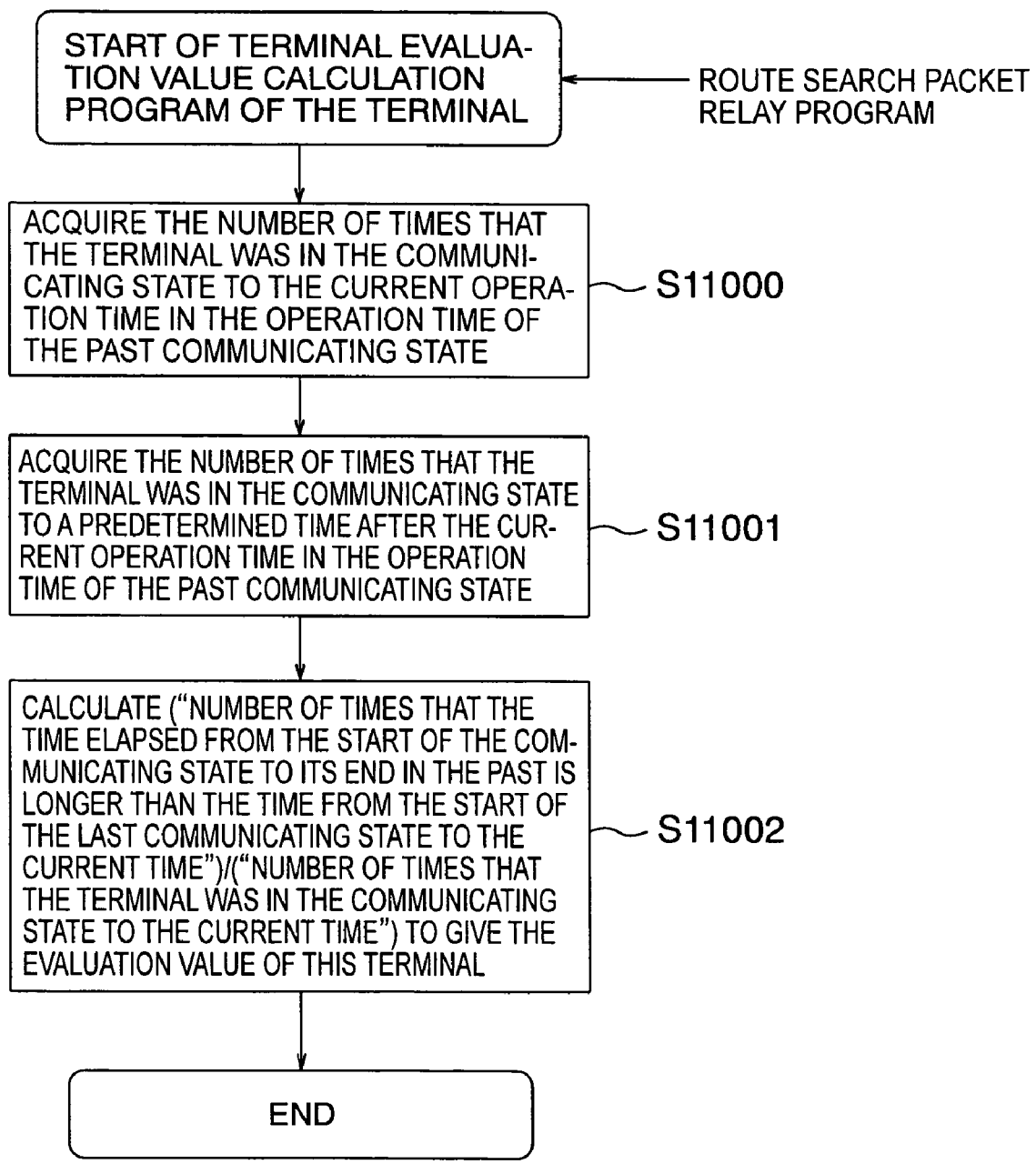
FIG. 39 is a flowchart showing the flow of terminal evaluation value calculation processing in the embodiment.

On the other hand, FIG. 39 shows an example of the flow of processing for calculating the evaluation value of a terminal in the latter case described above.

In response to an evaluation value calculation request from the route search packet relay program 816 (that is, when S6001 in FIG. 34 is executed), the terminal evaluation value calculation program 830 of the terminal shown in FIG. 39 starts processing.

First, the program acquires the number of times that the terminal was in the communicating states during the past communicating state time, that is, the number of times that the wireless communication function of the terminal once started was halted from the time that the wireless communication function of the terminal first started operation to the current time (S11000). For example, in the timing diagram in FIG. 24, the number of times that the terminal was in the communicating state from Power On (1) to the current time is five.

After that, the program compares the time elapsed from the start of the last communicating state to the current time with each of the times in the past from the start of the communicating state to its end to acquire the number of times that the time elapsed from the start of the communicating state to its end in the past is longer; that is, the comparison gives the number of times that the time elapsed from the start of the operation to its end is longer than the time elapsed from the start of the currently-active wireless communication function to the current time (S11001). For example, the timing diagram in FIG. 24 indicates that the number of times that the time of the communicating state is longer than the time elapsed from communicating start (5) to the current time is two: that is, from communicating start (2) to Power Off (1) and from communicating start (4) to error stop (3).

After that, the program calculates the (number of times that the time elapsed from the start of the communicating state to its end in the past is longer than the time from the start of the last communicating state to the current time)/(number of times that the terminal was in the communicating state to the current time) to give the evaluation value of this terminal (S11002). In the timing diagram shown in FIG. 24, the evaluation value of the terminal is 0.4 (2 times/5 times).

Although not shown in the figure, it is also possible to acquire the device information table 114 of an application device 110 via the application device communication processing unit 130 and, based on the terminal evaluation value table 141, calculate the evaluation value of the terminal from the device type code and the power supply type for use in evaluation.

For example, a relatively higher evaluation value should be assigned to a device whose device type is an specialized intermediary relay device 102 installed at a fixed place while a relatively lower evaluation value should be assigned to a device, such as a portable terminal 105, which is not installed at a fixed place. A relatively higher evaluation value should be assigned when the power supply type is 100 VAC, while a relatively low value when the power supply is a battery. The size of the RAM 122 of the wireless device 100 or the CPU processing power should also be considered; that is, when the size of the RAM 122 is large or the CPU processing power is high, a relatively high evaluation value should be assigned.

Returning to FIG. 34, after the processing in S6001, the program calculates the evaluation value of the intermediary path 510 between the source of the route search packet 620 and the terminal, that is, information indicating the reliability of the communication between the wireless device 100 from which the route search packet 620 is received and the terminal (S6002). The information indicating the reliability of the communication between the wireless device 100 from which the route search packet 620 is received and the terminal is, for example, the information indicating the strength of the radio wave used for the communication between the wireless device 100 from which the route search packet 620 is received and the terminal.

The flow of the processing for calculating the evaluation value of the intermediary path 510 between the source of the route search packet 620 and the terminal will be described with reference to FIG. 40. The evaluation value of the intermediary path 510 between the source of the route search packet 620 and the terminal is calculated by referring to the electric wave level history table 142 shown in FIG. 19.

Figure 40:
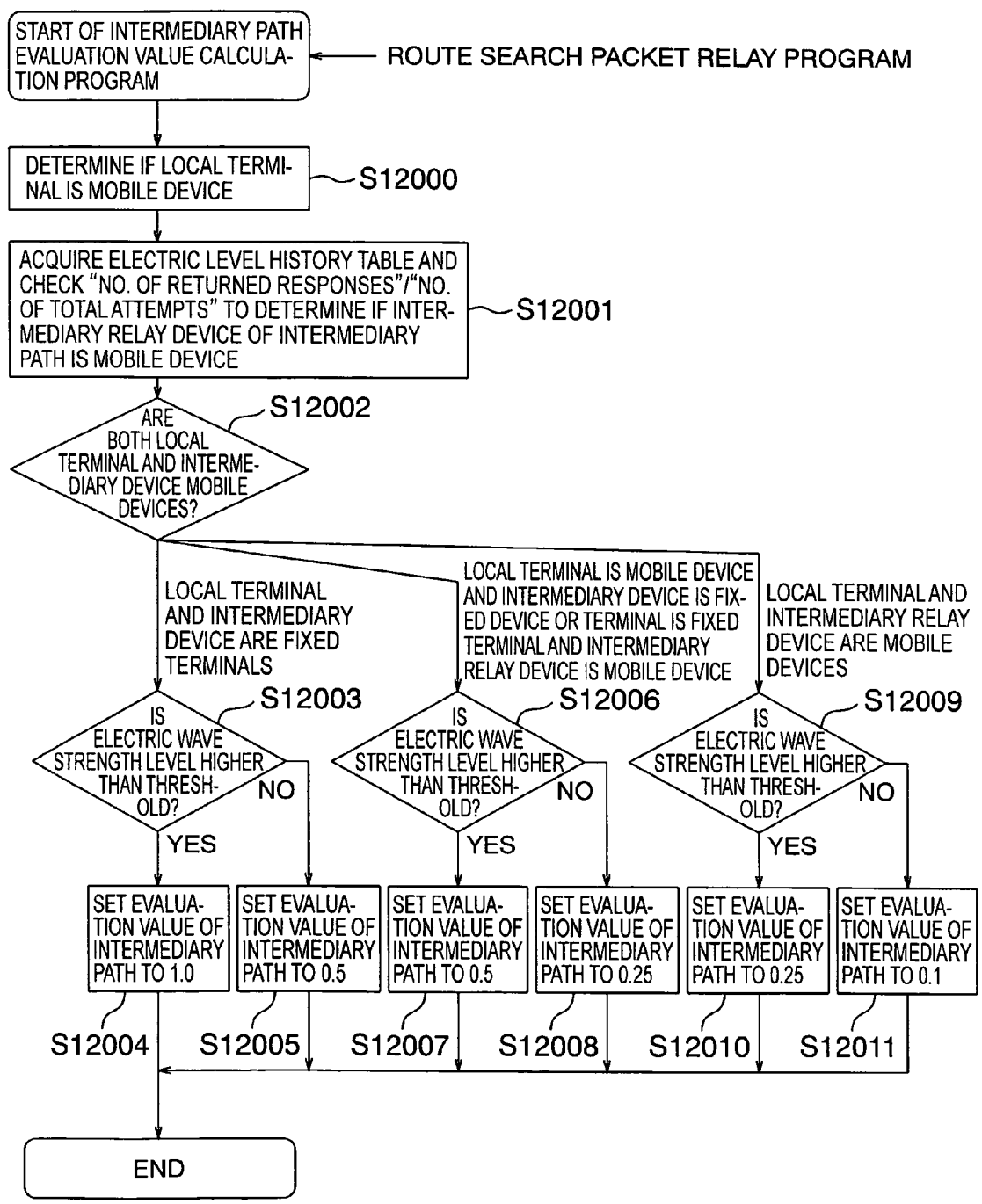
FIG. 40 is a flowchart showing the flow of intermediary path evaluation value calculation processing in the embodiment.

In response to an evaluation value calculation request from the route search packet relay program 816 (that is, when S6002 in FIG. 34 is executed), the intermediary path evaluation value calculation program 831 shown in FIG. 40 starts processing.

First, whether the terminal is a mobile device is checked (S12000). For example, the program acquires the device type of this terminal from the device information table 114 of the application device 110 and, if the application device 110 is a portable terminal 105, it is determined that the terminal is a mobile device.

Next, the program acquires the electric wave level history table 142 and analyzes the electric wave level history table 142 (Number of times the response is received/Total number of attempts) to determine if the terminal is a mobile device (S12001). For example, in the electric wave level history table 142 in FIG. 19, it can be determined that the terminal whose "lower address" is E is a mobile device because the "electric wave level" is changed to 0 at 3/1 10:31.

Next, whether the terminal and the intermediary relay device are mobile devices is determined (S12002), whether the electric wave level is equal to or higher than the threshold is determined (S12003, S12006, S12009), and the evaluation value of the corresponding intermediary path 510 is set (S12004, S12005, S12007, S12008, S12010, and S12011).

Although not shown in the figure, it is also possible to issue a broadcast packet to acquire the device information table 114 of the application device 110 built in or external to this wireless device 100 and the device information table 114 of the application device 110 of the wireless terminal 100 with which this terminal can directly communicate for calculating the evaluation value of the intermediary path 510 from the device type code or the power supply type.

Returning to FIG. 34, after the processing in S6002 is finished, a set of the lower address of this terminal (identifier of this wireless device), the evaluation value of this terminal (information indicating the operation ratio of the wireless communication function of this wireless device), and the path evaluation value (information indicating the reliability of the communication between the wireless device from which the route search packet is received and this wireless device) is added to the intermediary terminal information list in the route search packet 620 (S6003). The route search packet 620 is broadcast, that is, sent to the wireless devices 100 that can directly communicate with this wireless device (S6004).

Figure 35:
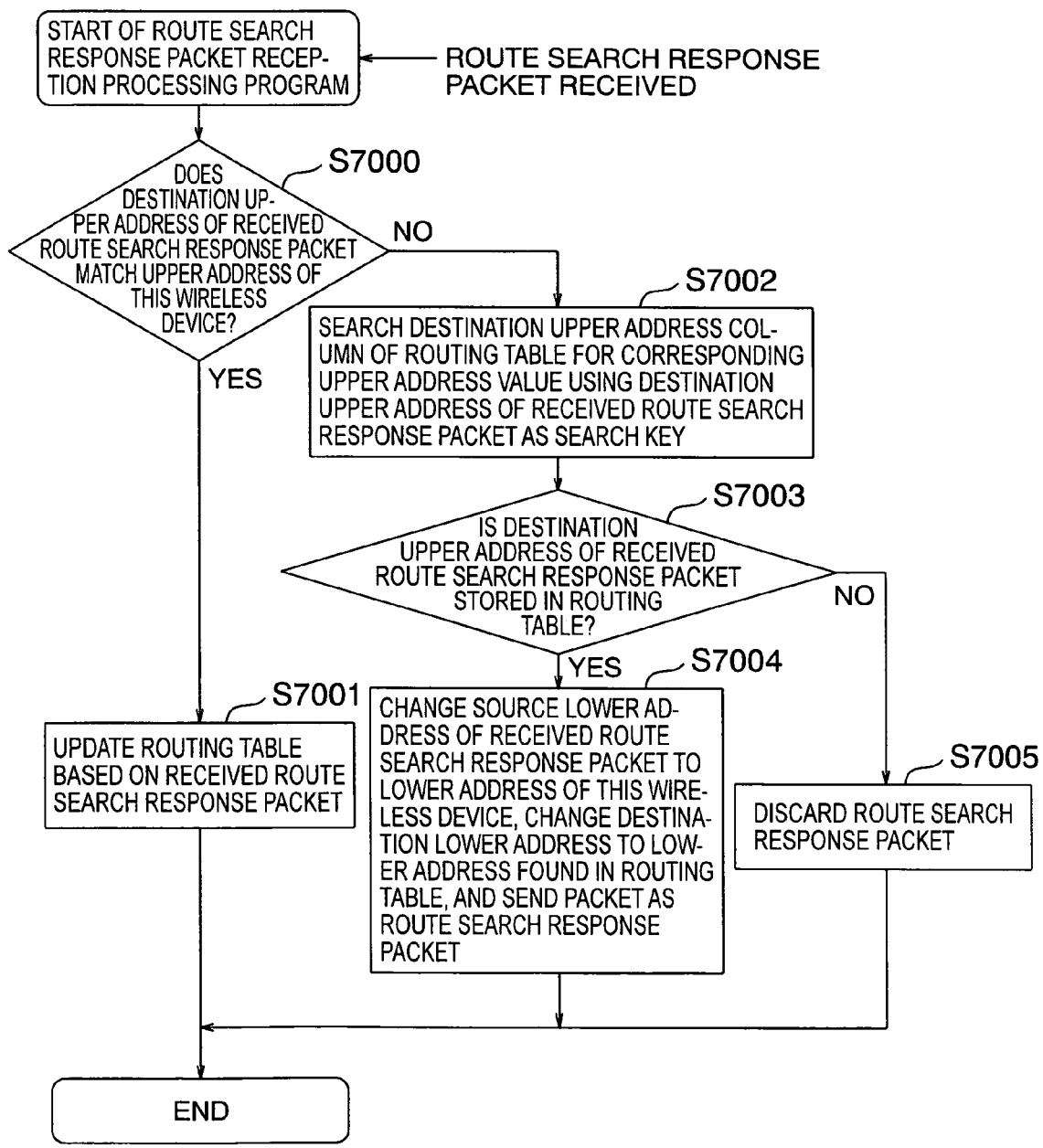
FIG. 35 is a flowchart showing the flow of route search response packet reception processing in the embodiment.

Next, FIG. 35 shows the flow of the route search response packet reception processing program 815.

In response to a route search response packet 630 from the packet reception processing program 811, the route search response packet reception processing program 815 starts processing.

First, whether the upper address of the received route search response packet 630 matches the upper address of this wireless device is checked (S7000). If they match, control is passed to the path indicated by "Yes". The routing table 140 is updated based on the received route search response packet 630 (S7001). More specifically, the identifier of the wireless device 100 indicating the destination of data included in the route search response packet 630 and the identifier of the wireless device 100 from which the route search response packet 630 is received are stored in the routing table 140 of this wireless device as the identifier of the wireless device 100 indicating the destination of data and the identifier of the next wireless device 100 to which data is to be sent.

On the other hand, if they do not match, control is passed to the path indicated by "No". The program searches the destination upper address column of the routing table 140 for the corresponding upper address value using the destination upper address of the received route search response packet 630 as the search key (S7002) to determine if the destination upper address of the route search response packet 630 is stored in the routing table 140 (S7003). If such an address is found in the routing table 140, control is passed to S7004; if not found, the route search response packet 630 can be discarded (S7005) to terminate the processing.

In S7004, the source lower address of the received route search response packet 630 is changed to the lower address of this wireless device, the destination lower address is changed to the lower address found in the routing table 140, and the packet can be sent as the route search response packet 630 to terminate the processing.

Figure 36:
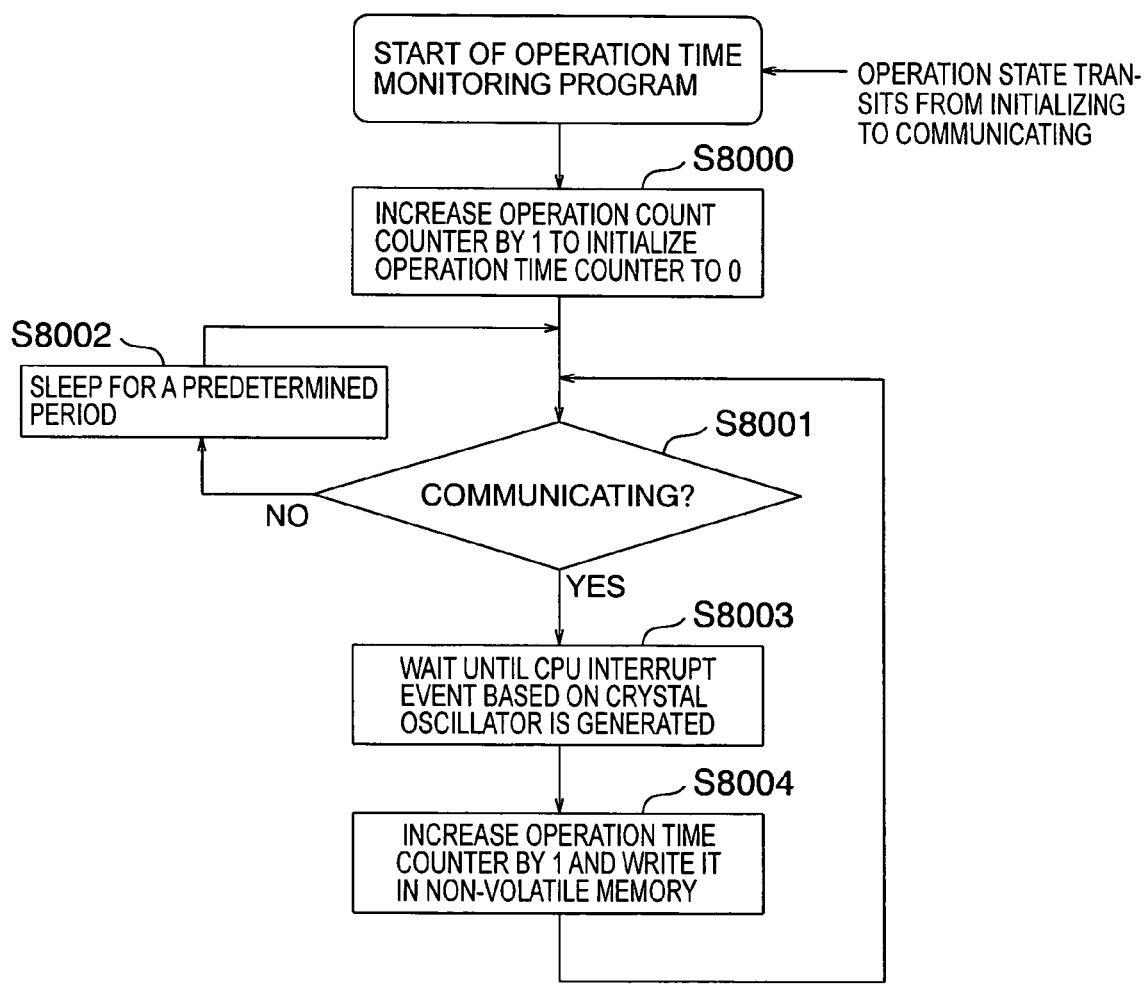
FIG. 36 is a flowchart showing the flow of operation time monitoring processing in the embodiment.

Next, FIG. 36 shows the flow of the operation time monitoring program 840.

The operation time monitoring program 840 is a program that monitors the operation time required to calculate an evaluation value stored in the route search packet 620.

When the operation state of the wireless device 100 transits from "initializing" to "communicating", the operation time monitoring program 840 starts processing.

First, the operation time monitoring program 840 increases the operation count counter 150 by 1 to initialize the operation time counter 151 to 0 (S8000). The operation count counter 150 is a counter in which the number of operations of the wireless communication function of this wireless device is stored. The operation time counter 151 is a counter in which the time elapsed from the operation start of the wireless communication function is stored.

Next, whether the current operation-state is "communicating" is determined (S8001). If the state is "communicating", control is passed to the path indicated by "Yes". If the state is not "communicating", control is passed to the path indicated by "No". The program sleeps for a predetermined period (S8002) and returns to S8000.

If the operation state is the "communicating state", the program waits until a CPU interrupt event based on the crystal oscillator is generated (S8003). When an interrupt event based on the crystal oscillator is generated, the operation time counter 151 is increased by 1 (S8004). While the operation state is the "communicating" state, the operation time counter 151 is increased repeatedly by 1 each time a CPU interrupt event is generated.

Figure 37:
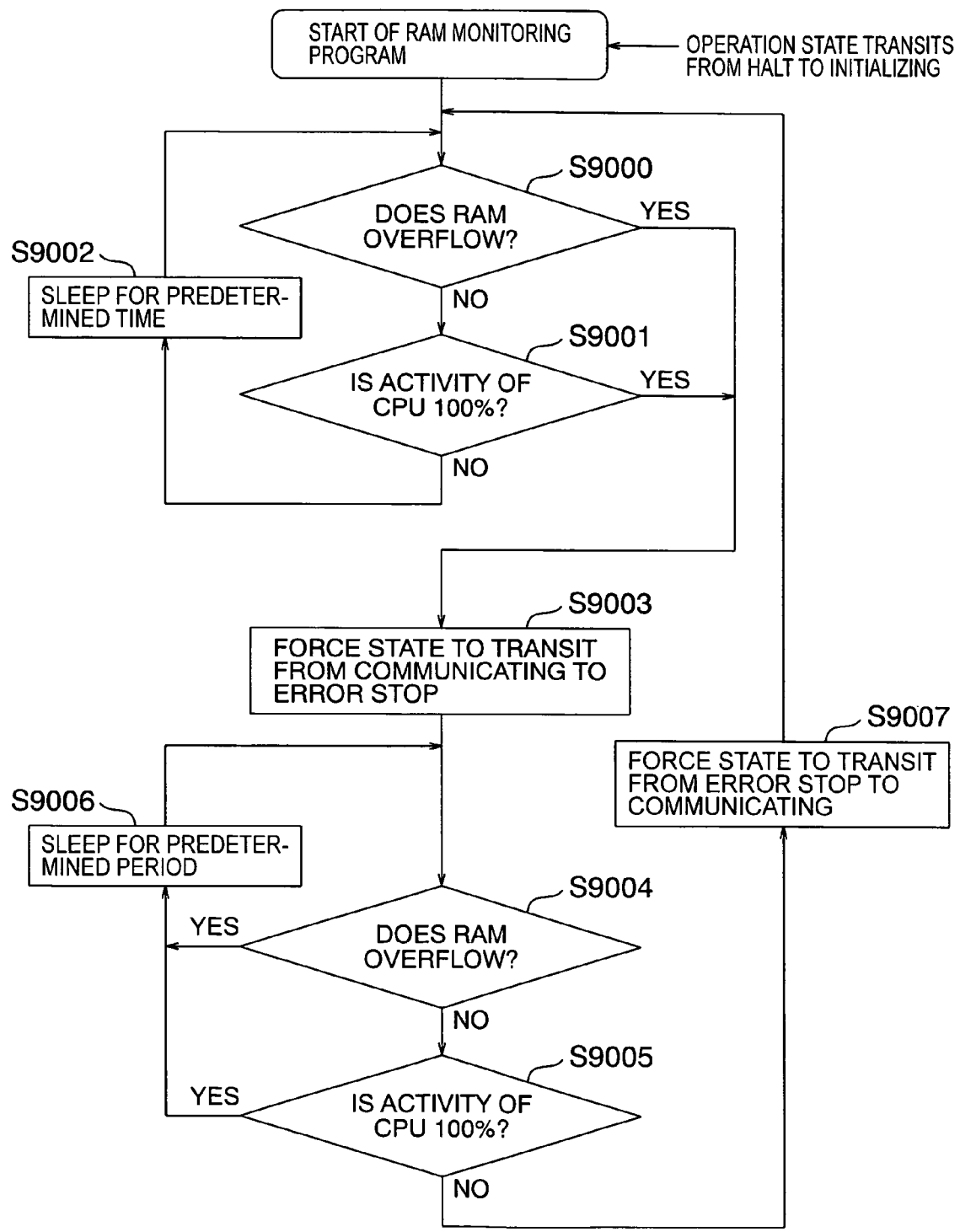
FIG. 37 is a flowchart showing the flow of RAM monitoring processing in the embodiment.

Next, FIG. 37 shows the flow of the RAM monitoring program 850.

The RAM monitoring program 850 is a program for monitoring an overflow of the RAM 122 that is related to the operation time calculation executed by the operation time monitoring program 840.

When the operation state of the wireless device 100 transits from "halt" to "initializing", the RAM monitoring program starts execution.

First, the RAM monitoring program 850 determines if the RAM 122 overflows (S9000). If the RAM 122 does not overflow, the program checks if the activity of the CPU 121 is 100% (S9001). If the activity of the CPU 121 is not 100%, then the program sleeps for a predetermined period (S9002) and returns to S9000.

On the other hand, if the RAM 122 overflows or if the activity of the CPU 121 is 100%, the program forces the operation state to transit from "communicating" to "error stop" (S9003).

After that, the program determines if the RAM 122 overflows (S9004) and, if it still overflows, sleeps for a predetermined period (S9006), and returns to S9004. If the RAM 122 does not overflow, the program determines if the activity of the CPU 121 is 100% (S9005). If the activity of the CPU 121 is not 100%, the program forces the operation state to transit from "error stop" to "communicating" (S9007) and returns to S9000.

The execution of the RAM monitoring program 850 as described above allows the operation state of the wireless device 100 to transit from "communicating" to "error stop" or from "error stop" to "communicating" according to the presence of an overflow of the RAM 122 or the activity of the CPU 121.

Figure 41:
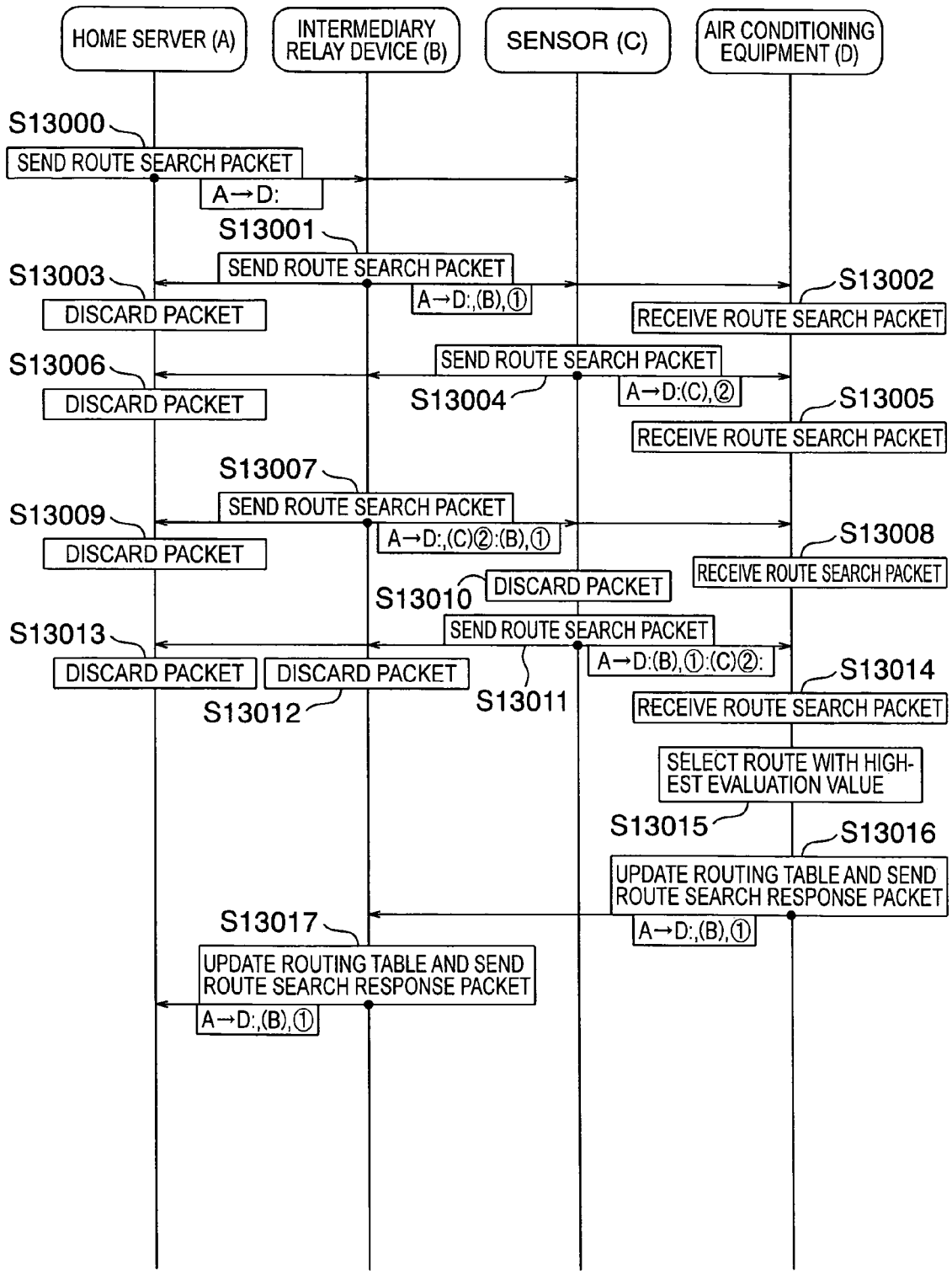
FIG. 41 is a flowchart showing the flow of processing in which a home server searches for a communication route to air conditioning equipment in the embodiment.
Figure 42:
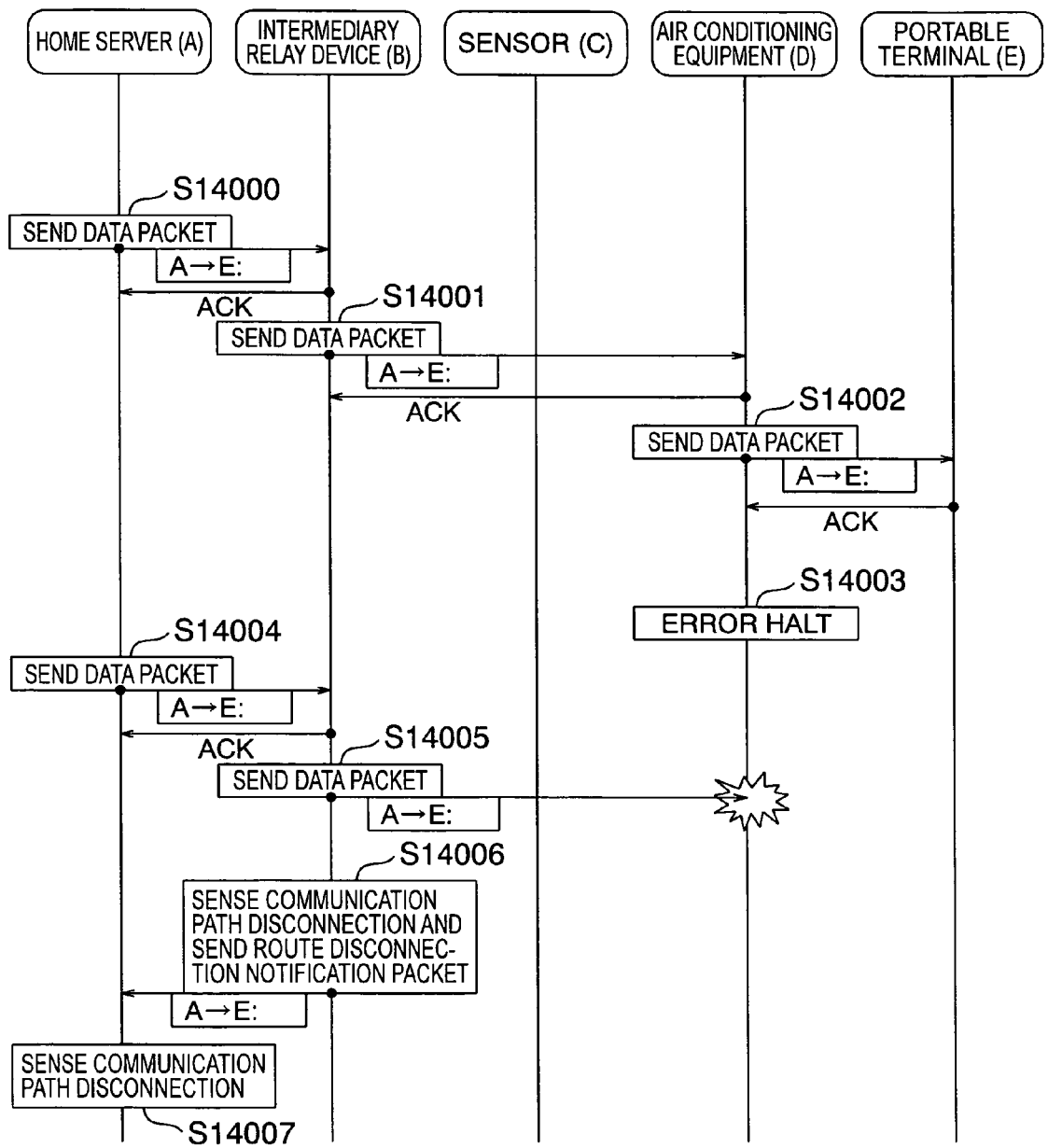
FIG. 42 is a flowchart showing the flow of processing in which a communication route is disconnected when the home server sends a data packet to a portable terminal in the embodiment.

Next, an example of the general operation in the wireless communication system 200 in this embodiment will be described with reference to FIG. 41 and FIG. 42. FIG. 41 shows the processing executed by the home server 101 to search for a communication route to the air conditioning equipment 104. FIG. 42 shows the processing executed when an intermediate communication route is disconnected during the transmission of a data packet 600 from the home server 101 to the portable terminal 105.

First, referring to FIG. 41, the home server 101 sends a route search packet 620 in the broadcast mode (S13000). Then, the specialized intermediary relay device 102 and the sensor 103 receive the route search packet 620.

The specialized intermediary relay device 102 executes the route search packet reception processing program 814 and the route search packet relay program 816 to receive the route search packet 620. The evaluation value of the terminal and the evaluation value of the path are added to the received route search packet 620 according to the procedure described above, and the route search packet 620 is sent in the broadcast mode (S13001). Then, the sensor 103 and the air conditioning equipment 104 receive the route search packet 620 based on the route search packet reception processing program 814 (S13002). On the other hand, the home server 101 discards the route search packet 620, sent from the specialized intermediary relay device 102, based on the route search packet reception processing program 814 and the route search packet relay program 816 (S13003).

Similarly, the sensor 103 sends the route search packet 620 in the broadcast mode (S13004). Then, the specialized intermediary relay device 102 and the air conditioning equipment 104 receive the route search packet 620 (S13005) but the home server 101 discards it (S13006).

The specialized intermediary relay device 102, which receives the route search packet 620 from the sensor 103, adds the evaluation value of the terminal and the evaluation value of the path to the route search packet 620 and sends the route search packet 620 in the broadcast mode (S13007).

This route search packet 620 is received by the air conditioning equipment 104 (S13008) but is discarded by the sensor 103 and the home server 101 (S13009, S13010).

Similarly, the sensor 103, which receives the route search packet 620 sent from the specialized intermediary relay device 102 in S13001, adds the evaluation value of the terminal and the evaluation value of the intermediary path to the route search packet 620 and sends the route search packet 620 in the broadcast mode (S13011). Then, the air conditioning equipment 104 receives the route search packet 620 (S13014) but the specialized intermediary relay device 102 and the home server 101 discard it (S13012, S13013).

The air conditioning equipment 104 selects the communication route with the highest evaluation value from a total of four route search packets 620 that have been received. (S13015).

The evaluation values of the communication routes are compared, for example, using the following expressions.

(Evaluation value of intermediary terminal (1)×evaluation value of intermediary terminal (2) . . . ×evaluation value of intermediary terminal (n))×(evaluation value of intermediary path (1)×evaluation value of intermediary path (2)× . . . ×evaluation value of intermediary path (m))

For example, when the evaluation value of the home server 101 is "0.95", the evaluation value of the intermediary relay device (102) is "0.95", and the evaluation value of the air conditioning equipment 104 is "0.7" and when the evaluation value of the intermediary path between the home server 101 and the intermediary relay device (102) is "1.0" and the evaluation value of the intermediary path between the specialized intermediary relay device 102 and the air conditioning equipment (104) is "1.0", the evaluation value of the communication route in which the home server 101, the intermediary relay device (102), and the air conditioning equipment (104) provided in this order is (0.95×0.95×0.7)×(1.0×

1.0), that is, 0.63. This value of "0.63" is the evaluation value of the communication route in which the home server 101, intermediary relay device (102), and air conditioning equipment (104) are provided in this order.

The air conditioning equipment 104 updates the routing table 140 and sends the route search response packet 630 to the specialized intermediary relay device 102 (S13016). The specialized intermediary relay device 102 updates the routing table 140 based on the route search response packet reception processing program 815 and sends the route search response packet 630 to the home server 101 (S13017).

The processing described above allows the home server 101 to search for the best communication route to the air conditioning equipment 104.

Next, with reference to FIG. 42, the following describes the processing executed when an intermediate communication route is disconnected during the transmission of a data packet 600 from the home server 101 to the portable terminal 105.

The home server 101 executes the data packet transmission processing program 810 to send a data packet 600, whose destination is the portable terminal 105, along the communication route to the specialized intermediary relay device 102 that is the next device to receive the packet (S14000). Then, the specialized intermediary relay device 102 executes the data packet reception processing program 812 to receive the data packet 600. The specialized intermediary relay device 102 sends the data packet 600 to the air conditioning equipment 104 that is the next device to receive the packet (S14001). The air conditioning equipment 104 sends the received data packet 600 along the communication route to the portable terminal 105 that is the next device to receive the packet (S14002).

At this time, when an error is detected in the wireless terminal 120 of the air conditioning equipment 104, the operation state of the air conditioning equipment 104 transits to "error stop" (S14003).

In this case, even if the data packet 600 to be sent to the portable terminal 105 is sent from the home server 101 (S14004) and the specialized intermediary relay device 102 tries to send the data packet 600 to the air conditioning equipment 104 (S14005), the specialized intermediary relay device 102 cannot confirm the reception response (Acknowledge) from the air conditioning equipment 104. Therefore, the specialized intermediary relay-device 102 sends a route no-communication notification packet 610 to the home server 101 based on the data packet reception processing program 812 (S14006).

The home server 101 receives the route no-communication notification packet 610 from the specialized intermediary relay device 102 and finds that the error occurred in the communication route to the portable terminal 105.

After that, the home server 101 searches for a new communication route to the portable terminal 105 according to the procedure shown in FIG. 41.

The wireless communication system 200, the control method for the wireless communication system 200, and the wireless device 100 in this embodiment have been described. In the wireless communication system 200 where many wireless devices 100 in this embodiment communicate each other via other wireless devices 100, a stable, reliable communication environment where the search for a communication route is required less frequently can be provided even if a wireless device 100 that relays communication between wireless terminals is moved or is turned off. That is, the selection of a more reliable communication route reduces the frequency of creating a poor-performance, communication-error-prone communication route, thus ensuring high performance and reliability.

In addition, the control method for the wireless communication system 200 in this embodiment provides the wireless communication system 200 that provides a stable, reliable communication environment where the search for a communication route is required less frequently. In addition, the control method for the wireless communication system 200 in this embodiment, which can be implemented by software without using special hardware parts for the wireless devices 100, provides the wireless communication system 200 that provides a stable, reliable communication environment at a low cost where the search for a communication route is required less frequently.

In addition, the wireless device 100 in this embodiment, which can be implemented by software without using special hardware parts, is less expensive and compact. This makes it possible to build a reliable wireless communication system 200 easily and at a low cost in the home and a building.

Although the present invention has been described in its preferred form, it should be understood that the embodiment described above is illustrative only and not restrictive. It should be understood that various changes and modifications may be made in the present invention without departing from the spirit thereof and that the equivalents are included in the present invention.

The invention claimed is:

1. A wireless device for use in a wireless communication system comprising a plurality of wireless devices wherein communication between the wireless devices is carried out by sending data, which is received from some other wireless device, from one of said wireless devices to a next wireless device via a communication route determined in advance according to a destination of the data, said wireless device comprising:

means to store;

a communication route management table in which an identifier of a data destination wireless device is associated with an identifier of the wireless device indicating a next destination of the data, and information indicating an operation ratio of a wireless communication function of said wireless device;

means to send a route search packet to the wireless devices that can directly communicate with said wireless device when data is sent to one of the other wireless devices via a new communication route, said route search packet including an identifier of the other wireless device that is a data destination and an identifier of said wireless device that is a search source of the new communication route;

means, for use when the route search packet is received and if the identifier of the destination wireless device included in the received route search packet does not match the identifier of said wireless device, to add the identifier of the wireless device and the information indicating an operation ratio of a wireless communication function of said wireless device, to the received route search packet and to send the route search packet to the wireless devices that can directly communicate with said wireless device;

means, for use when the route search packet is received and if the identifier of the destination wireless device included in the received route search packet matches the identifier of the wireless device, to calculate a reliability of a communication route via which the route search packet is sent based on the information indicating the operation ratios of the wireless devices added by the wireless devices via which the received route search packet is sent; and means to determine the new communication route for sending the data from the search source wireless device to said wireless device itself-based on the information indicating the communication route reliability calculated for each of the route search packets that are sent with said wireless device as the destination;

wherein the information indicating the operation ratio of the wireless communication function of said wireless device is information indicating a ratio of a number of wireless communication function operations, whose operation time elapsed from a start to an end is longer than a time elapsed from a start of a currently-active wireless communication function operation to a current time, to a number of wireless communication function operations that were once started and ended during a period of time from a start of the wireless communication function of said wireless device to the current time.

2. The wireless device according to claim 1, comprising:

means to send a route search response packet to a neighboring wireless device on a search source wireless device side in the new communication route, said route search response packet including identifiers of the wireless devices in the determined new communication route;

means, for use when the route search response packet is received and if the identifier of the search source wireless device included in the route search response packet does not match the identifier of said wireless device, to store the identifier of the data destination wireless device and an identifier of a wireless device that sends the route search response packet to said wireless device, both of which are included in the route search response packet, as the identifier of the data destination wireless device and the identifier of the wireless device indicating the next destination of the data respectively in the communication route management table of said wireless device;

means to send the route search response packet to a neighboring wireless device on the search source wireless device side in the new communication route; and means, for use when the route search response packet is received and if the identifier of the search source wireless device included in the route search response packet matches the identifier of said wireless device, to store the identifier of the data destination wireless device and an identifier of a wireless device that sends the route search response packet to said wireless device, both of which are included in the route search packet, as the identifier of the data destination wireless device and the identifier of the wireless device indicating the next destination of the data respectively in the communication route management table of said wireless device.

3. The wireless device according to claim 1, comprising:

means to store information indicating a reliability of communication between said wireless device and each of the wireless devices that can directly communicate with said wireless device;

means, for use when the route search packet is received and if the identifier of the destination wireless device included in the received route search packet does not match the identifier of said wireless device, to add the identifier of the wireless device, the information indicating the operation ratio of the wireless communication function of said wireless device, and information indicating the reliability of communication between the wireless device that sends the route search packet to said wireless device, and said wireless device to the received route search packet and to send the route search packet to the wireless devices that can directly communicate with said wireless device; and means, for use when the route search packet is received and if the identifier of the destination wireless device included in the received route search packet matches the identifier of the wireless device, to calculate a reliability of a communication route via which the route search packet is sent, based on the information indicating the operation ratios of the wireless devices added by the wireless devices via which the received route search packet is sent, the information indicating the reliability of each communication, and the information indicating the reliability of communication between the wireless device that sends the route search packet to said wireless device and said wireless device.

4. The wireless device according to claim 3, wherein, the information indicating a reliability of communication between said wireless device and each of the wireless devices that can directly communicate with said wireless device is a strength of a radio wave used for communication with the wireless devices.

5. The wireless device according to claim 1, wherein, when the route search packet is received and if the identifier of said wireless device is already added to the received route search packet, the route search packet is not sent.

6. The wireless device according to claim 1, comprising:

means, for use when the data sent from a data source wireless device to said wireless device via the communication route determined according to the destination of the data is received and if a communication error is detected during a communication with the next-destination wireless device that is stored in the communication route management table of said wireless device as an entry associated with the destination of the data, to send a route no-communication notification packet, which indicates that the data cannot be sent to the destination, to the wireless device stored in the communication route management table as an entry associated with the source wireless device with the data source wireless device as a destination;

means, for use when the route no-communication notification packet is received and if said wireless device does not match the destination of the route no-communication notification packet, to send the route no-communication notification packet to the next-destination wireless device that is stored in the communication route management table of said wireless device as an entry associated with the destination of the route no-communication notification packet; and means, for use when the route no-communication notification packet is received and if said wireless device is the destination of the route no-communication notification packet, to send the route search packet to the wireless devices that can directly communicate with said wireless device in order to send the data to the destination via a new communication route.

7. The wireless device according to claim 1, comprising:

means, for use when the data sent from a source wireless device of the data to said wireless device via the communication route determined according to the destination of the data is received and if a communication error is detected during a communication with the next-destination wireless device that is stored in the communication route management table of said wireless device as an entry associated with the destination of the data, to send the route search packet to the wireless devices that can directly communicate with said wireless device for sending the data to the destination via a new communication route.

8. The wireless device according to claim 1, comprising:
means, for use if the identifier of the destination wireless device included in the received route search packet matches the identifier of said wireless device and if there are two or more communication routes with the same communication route reliability information, to determine a communication route, which includes the least number of wireless devices in a route from the search source wireless device to said wireless device, as a new communication route, said communication route reliability information being calculated based on the information indicating the operation ratios of the wireless devices added by the wireless device via which the received route search packet is sent.

9. The wireless device according to claim 1, comprising:
means, for use if the identifier of the destination wireless device included in the received route search packet matches the identifier of the wireless device and if there are two or more communication routes with the same communication route reliability information, to determine a communication route, via which an earliest received route search packet is sent, as a new communication route, said communication route reliability information being calculated based on the information indicating the operation ratios of the wireless devices added by the wireless device via which the received route search packet is sent.

10. A wireless communication system control method for use in a wireless communication system comprising a plurality of wireless devices wherein communication between the wireless devices is carried out by sending data, which is received from some other wireless device, from one of said wireless devices to a next wireless device via a communication route determined in advance according to a destination of the data, said wireless communication system control method comprising:
storing, by each of said wireless devices,
a communication route management table in which an identifier of a data destination wireless device is associated with an identifier of the wireless device indicating a next destination of the data, and
information indicating an operation ratio of a wireless communication function of said wireless device;
sending, by a second wireless device that sends data via a new communication route with a first wireless device as a destination, a route search packet to the wireless devices that can directly communicate with said wireless device, said route search packet including an identifier of the first wireless device that is a data destination and an identifier of said wireless device that is a search source of the new communication route;
if the identifier of the first wireless device included in the received route search packet does not match the identifier of said wireless device, adding, by the wireless device that receives the route search packet, the identifier of the wireless device and the information indicating an operation ratio of a wireless communication function of said wireless device to the received route search packet and sending the route search packet to the wireless devices that can directly communicate with said wireless device;

if the identifier of the first wireless device included in the received route search packet matches the identifier of the wireless device, calculating, by the wireless device that receives the route search packet, a reliability of a communication route via which the route search packet is sent based on the information indicating the operation ratios of the wireless devices added by the wireless devices via which the received route search packet is sent;
determining, by the wireless device that receives the route search packet, the new communication route for sending the data from the second wireless device to the first wireless device based on the information indicating the communication route reliability calculated for each of the route search packets that are sent with said wireless device as the destination;
sending, by the wireless devices that receives the route search packet, a route search response packet to a neighboring wireless device on a search second wireless device side in the new communication route, said route search response packet including identifiers of the wireless devices in the determined new communication route from the second wireless device to the first wireless device;
if the identifier of the second wireless device included in the route search response packet does not match the identifier of said wireless device, storing, by the wireless device that receives the route search response packet, the identifier of the first wireless device and an identifier of a wireless device that sends the route search response packet to said wireless device, both of which are included in the route search response packet, as the identifier of the wireless device indicating the destination of the data and the identifier of the wireless device indicating the next destination of the data respectively in the communication route management table of said wireless device;
sending, by the wireless device that receives the route search response packet, the route search response packet to a neighboring wireless device on the second wireless device side in the new communication route; and
if the identifier of the search second wireless device included in the route search response packet matches the identifier of said wireless device, storing, by the wireless device that receives the route search response packet, the identifier of the first wireless device and an identifier of a wireless device that sends the route search response packet to said wireless device, both of which are included in the route search response packet, as the identifier of the data destination wireless device and the identifier of the wireless device indicating the next destination of the data respectively in the communication route management table of said wireless device;
wherein the information indicating the operation ratio of the wireless communication function of said wireless device is information indicating a ratio of a number of wireless communication function operations, whose operation time elapsed from a start to an end is longer than a time elapsed from a start of a currently-active wireless communication function operation to a current time, to a number of wireless communication function operations that were once started and ended during a period of time from a start of the wireless communication function of said wireless device to the current time.

11. The wireless communication system control method according to claim 10, comprising:

storing information indicating a reliability of communication between said wireless device and each of the wireless devices that can directly communicate with said wireless device;

if the identifier of the first wireless device included in the route search packet does not match the identifier of said wireless device, adding, by the wireless device that receives the route search packet, the identifier of the wireless device, the information indicating the operation ratio of the wireless communication function of said wireless device, and information indicating the reliability of communication between the wireless device that sends the route search packet to said wireless device and said wireless device to the received route search packet; and if the identifier of the first wireless device included in the route search packet matches the identifier of the wireless device, calculating, by the wireless device that receives the route search packet, a reliability of a communication route via which the route search packet is sent, based on the information indicating the operation ratios of the wireless devices added by the wireless devices via which the received route search packet is sent, the information indicating the reliability of each communication, and the information indicating the reliability of communication between the wireless device that sends the route search packet to said wireless device and said wireless device.

12. The wireless communication system control method according to claim 11, wherein,
the information indicating a reliability of communication between said wireless device and each of the wireless devices that can directly communicate with said wireless device is a strength of a radio wave used for communication with the wireless devices.

13. The wireless communication system control method according to claim 10, comprising:
if the identifier of said wireless device is already added to the received route search packet, skipping, by the wireless device that receives the route search packet, the transmission of the route search packet.

14. The wireless communication system control method according to claim 10, wherein the second wireless device that sends data to the first wireless device, which is the destination, via the new communication route is a source wireless device of the data, said wireless communication system control method comprising:
if a communication error is detected during a communication with the next-destination wireless device that is stored in the communication route management table of said wireless device as an entry associated with the destination of the data, sending, by a wireless device that receives the data from the second wireless device that is the data source of the data whose destination is the first wireless device via the communication route determined according to the destination of the data, a route no-communication notification packet to the wireless device stored in the communication route management table of said wireless device as an entry associated with the second wireless device with the second wireless device as the destination of the route no-communication notification packet, said route no-communication notification packet indicating that the data cannot be sent to the destination;

if said wireless device is not the destination of the route no-communication notification packet, sending, by the wireless device that receives the route no-communication notification packet, the route no-communication notification packet to the next-destination wireless device that is stored in the communication route management table of said wireless device as an entry associated with the second wireless device; and if said wireless device is the destination of the route no-communication notification packet, sending, by the wireless device that receives the route no-communication notification packet, the route search packet to the wireless devices that can communicate directly with said wireless device in order to send the data to the first wireless device via a new communication route.

15. The wireless communication system control method according to claim 10, comprising:
detecting, by the second wireless device that sends data via the new communication route with the first wireless device as the destination, an error during a communication with the next-destination wireless device that is stored in the communication route management table of said wireless device as an entry associated with the destination of the data.

16. A wireless communication system comprising a plurality of wireless devices wherein communication between the wireless devices is carried out by sending data, which is received from some other wireless device, from one of said wireless devices to a next wireless device via a communication route determined in advance according to a destination of the data, each of the wireless devices comprising:
means to store;
a communication route management table in which an identifier of a data destination wireless device is associated with an identifier of the wireless device indicating a next destination of the data, and
information indicating an operation ratio of a wireless communication function of said wireless device;
means, for use by a second wireless device that sends data via a new communication route with a first wireless device as a destination, to send a route search packet to the wireless devices that can directly communicate with said wireless device, said route search packet including an identifier of the first wireless device that is a data destination and an identifier of said wireless device that is a search source of the new communication route;
means, for use by the wireless device that receives the route search packet if the identifier of the first wireless device included in the received route search packet does not match the identifier of said wireless device, to add the identifier of the wireless device and the information indicating an operation ratio of a wireless communication function of said wireless device to the received route search packet and send the route search packet to the wireless devices that can directly communicate with said wireless device;
means, for use by the wireless device that receives the route search packet if the identifier of the first wireless device included in the received route search packet matches the identifier of the wireless device, to calculate a reliability of a communication route via which the route search packet is sent based on the information indicating the operation ratios of the wireless devices added by the wireless devices via which the received route search packet is sent;
means, for use by the wireless device that receives the route search packet, to determine the new communication route for sending the data from the second wireless device to the first wireless device based on the information indicating the communication route reliability calculated for each of the route search packets that are sent with said wireless device as the destination;

means, for use by the wireless devices that receives the route search packet, to send a route search response packet to a neighboring wireless device on a search second wireless device side in the new communication route, said route search response packet including identifiers of the wireless devices in the determined new communication route from the second wireless device to the first wireless device;

means, for use by the wireless device that receives the route search response packet if the identifier of the second wireless device included in the route search response packet does not match the identifier of said wireless device, to store the identifier of the first wireless device and an identifier of a wireless device that sends the route search response packet to said wireless device, both of which are included in the route search response packet, as the identifier of the wireless device indicating the destination of the device and the identifier of the wireless device indicating the next destination of the data respectively in the communication route management table of said wireless device;

means, for use by the wireless device that receives the route search response packet, to send the route search response packet to a neighboring wireless device on the second wireless device side in the new communication route; and means, for by the wireless device that receives the route search response packet if the identifier of the search second wireless device included in the route search response packet matches the identifier of said wireless device, to store the identifier of the first wireless device and an identifier of a wireless device that sends the route search response packet to said wireless device, both of which are included in the route search response packet, as the identifier of the data destination wireless device and the identifier of the wireless device indicating the next destination of the data respectively in the communication route management table of said wireless device;

wherein the information indicating the operation ratio of the wireless communication function of said wireless device is information indicating a ratio of a number of wireless communication function operations, whose operation time elapsed from a start to an end is longer than a time elapsed from a start of a currently-active wireless communication function operation to a current time, to a number of wireless communication function operations that were once started and ended during a period of time from a start of the wireless communication function of said wireless device to the current time.

* * * * *